June 13, 1961 G. W. MAYLE 2,988,217
DATA PROCESSING SYSTEM
Filed March 11, 1957 11 Sheets-Sheet 1

| | PARITY | ZONE | FIELD | | | |
|---|---|---|---|---|---|---|
| A | | ● | ● | | | ● |
| B | ● | | ● | | ● | |
| C | | | ● | | ● | ● |
| D | ● | | ● | ● | | |
| E | | | ● | | ● | ● |
| F | | | ● | | ● | ● |
| G | ● | | ● | | ● | ● |
| H | ● | | ● | ● | | |
| I | | | ● | ● | | ● |
| J | ● | ● | | | | ● |
| K | ● | ● | | | ● | |
| L | | ● | | | ● | ● |
| M | ● | ● | | ● | | |
| N | | ● | | | ● | ● |
| O | | ● | | | ● | ● |
| P | ● | ● | | | ● | ● |
| Q | ● | ● | | ● | | |
| R | | ● | | | ● | ● |
| S | | ● | ● | | | ● |
| T | | ● | ● | | ● | |
| U | ● | ● | ● | | ● | ● |
| V | | ● | ● | | ● | |
| W | ● | ● | ● | | ● | |
| X | | ● | ● | | ● | ● |
| Y | | ● | ● | ● | | |
| Z | ● | ● | ● | ● | | ● |

| | PARITY | ZONE | FIELD | | | |
|---|---|---|---|---|---|---|
| 0 | | ● | | a | b | c | d |
| 1 | | | | | | | ● |
| 2 | | | | | | ● | |
| 3 | ● | | | | | ● | ● |
| 4 | | | | | ● | | |
| 5 | | ● | | | ● | | ● |
| 6 | ● | | | | ● | ● | |
| 7 | | | | | ● | ● | ● |
| 8 | | | | ● | | | |
| 9 | ● | | | ● | | | ● |

INVENTOR
George W. Mayle

By Smyth & Roston
Attorneys

June 13, 1961 G. W. MAYLE 2,988,217
DATA PROCESSING SYSTEM
Filed March 11, 1957 11 Sheets-Sheet 2

INVENTOR
George W. Mayle
Attorneys

June 13, 1961  G. W. MAYLE  2,988,217
DATA PROCESSING SYSTEM
Filed March 11, 1957  11 Sheets-Sheet 3
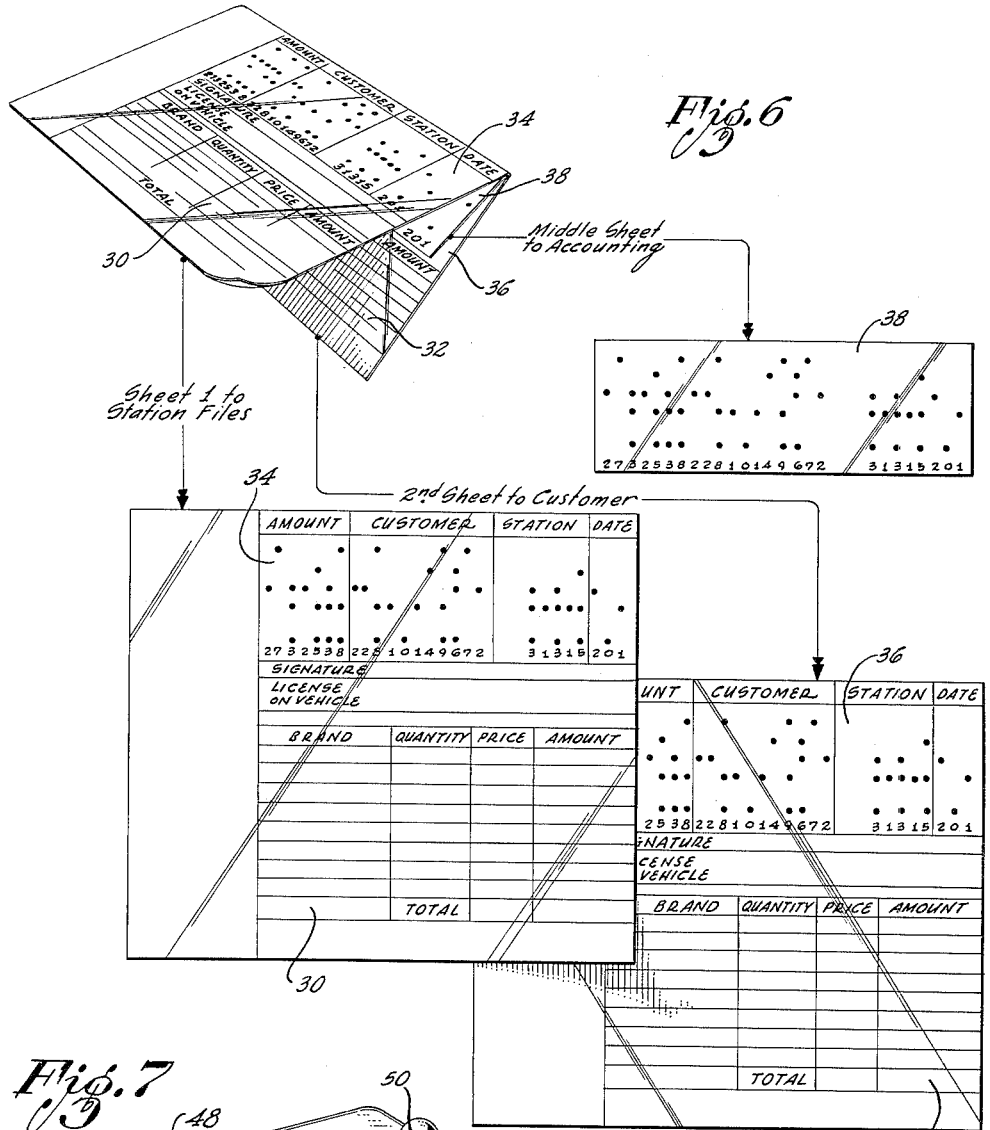
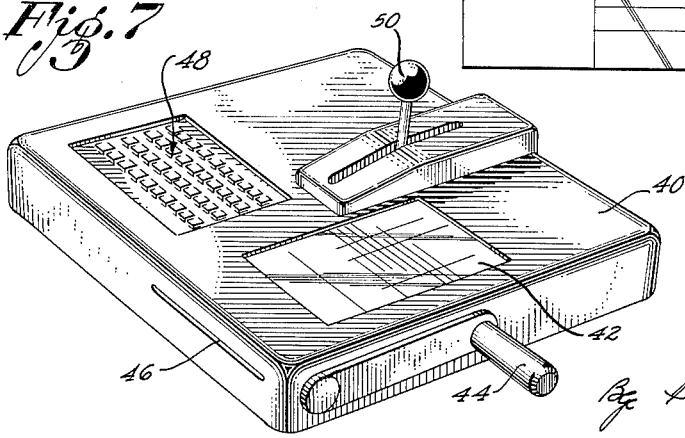
INVENTOR
George W. Mayle
By Smyth & Roston
Attorneys June 13, 1961 G. W. MAYLE 2,988,217
DATA PROCESSING SYSTEM
Filed March 11, 1957 11 Sheets-Sheet 4
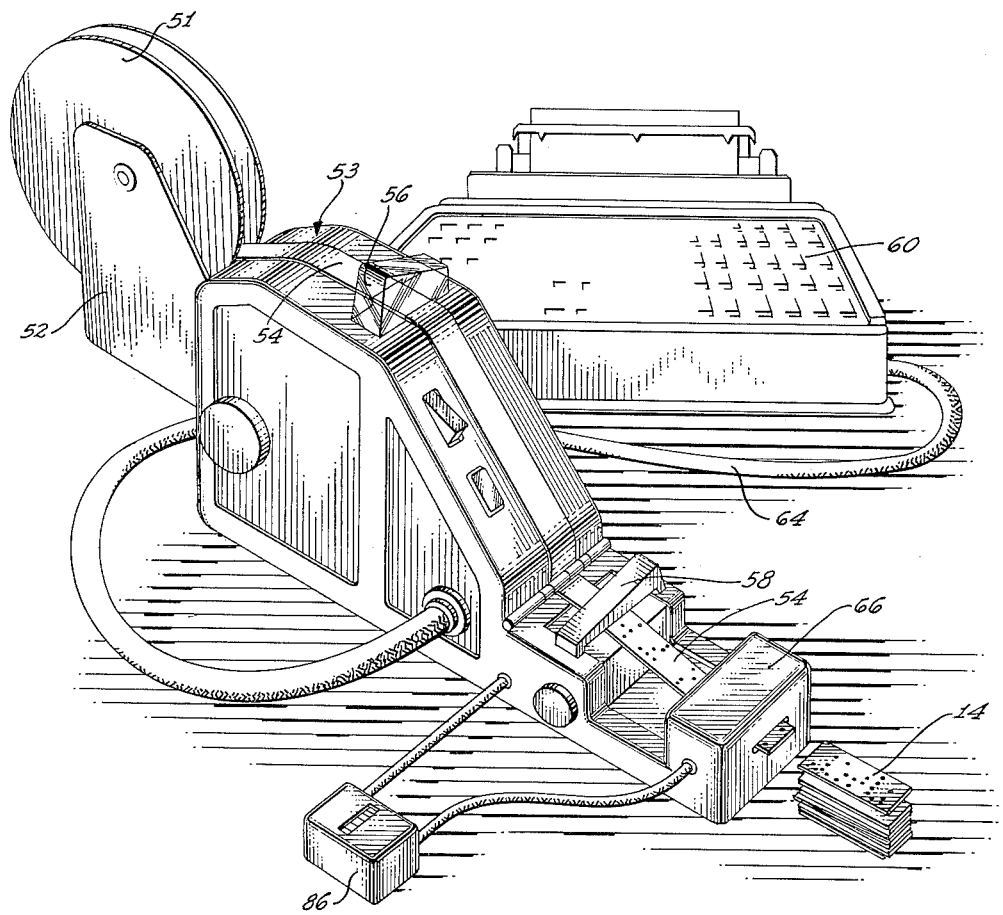
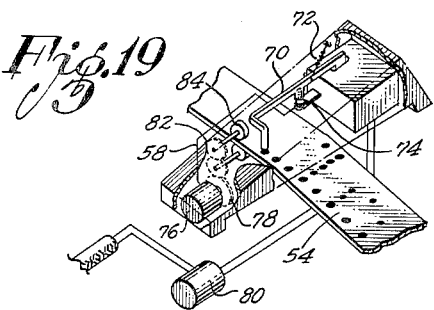
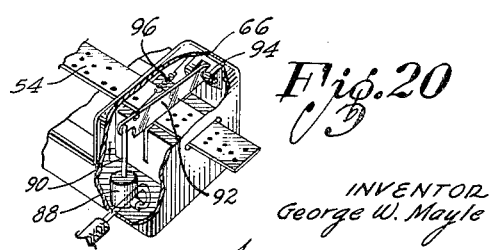
INVENTOR
George W. Mayle

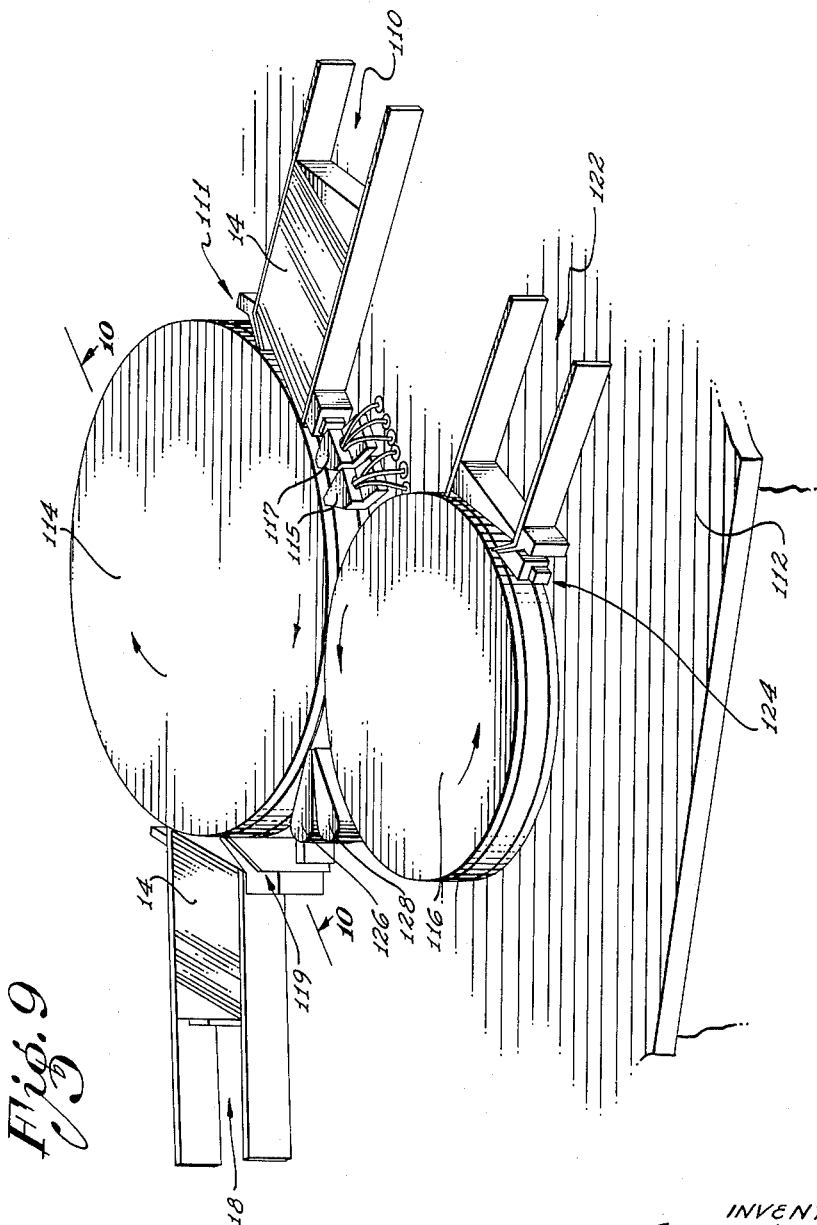

June 13, 1961

G. W. MAYLE 2,988,217

DATA PROCESSING SYSTEM

Filed March 11, 1957

INVENTOR:
George W. Mayle

By Smyth & Roston
Attorneys

June 13, 1961  G. W. MAYLE  2,988,217
DATA PROCESSING SYSTEM
Filed March 11, 1957  11 Sheets-Sheet 8
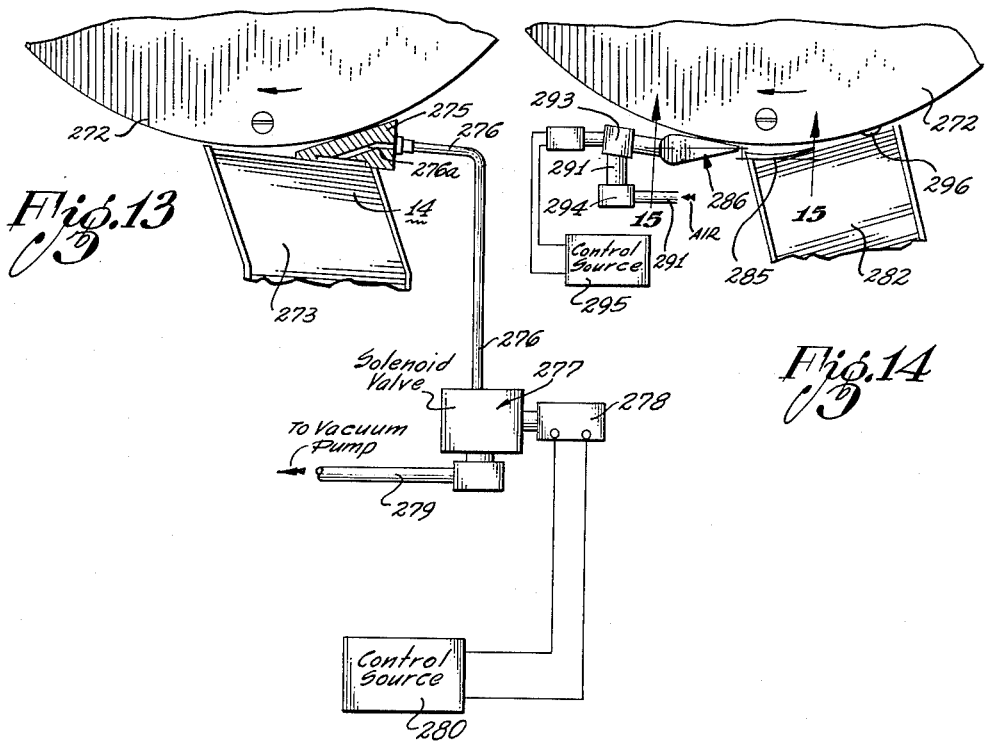
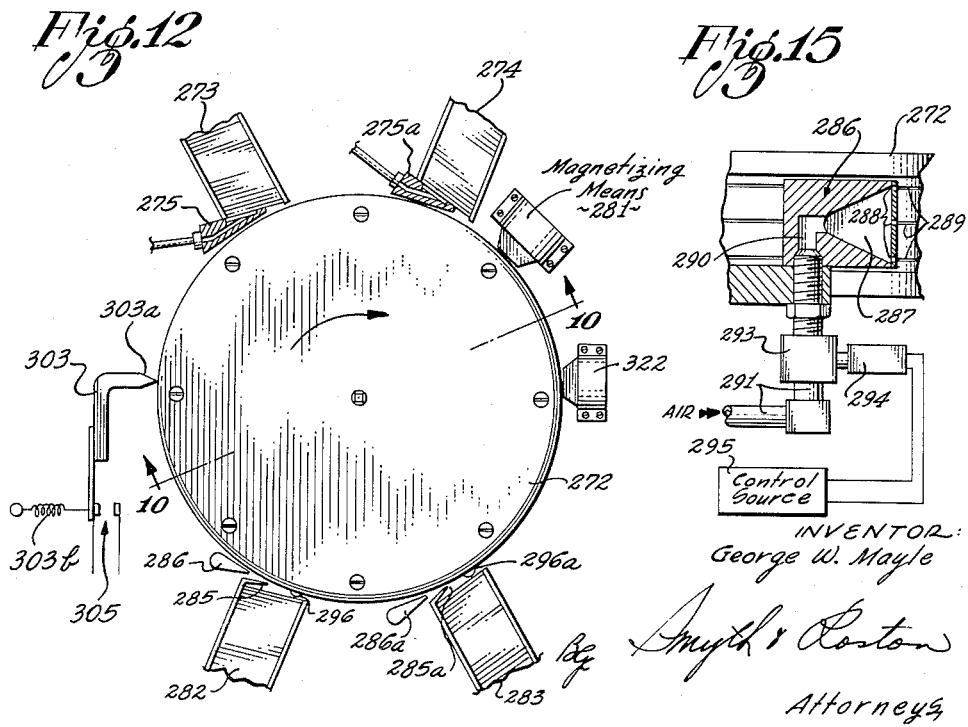
INVENTOR:
George W. Mayle
Smyth & Roston
Attorneys

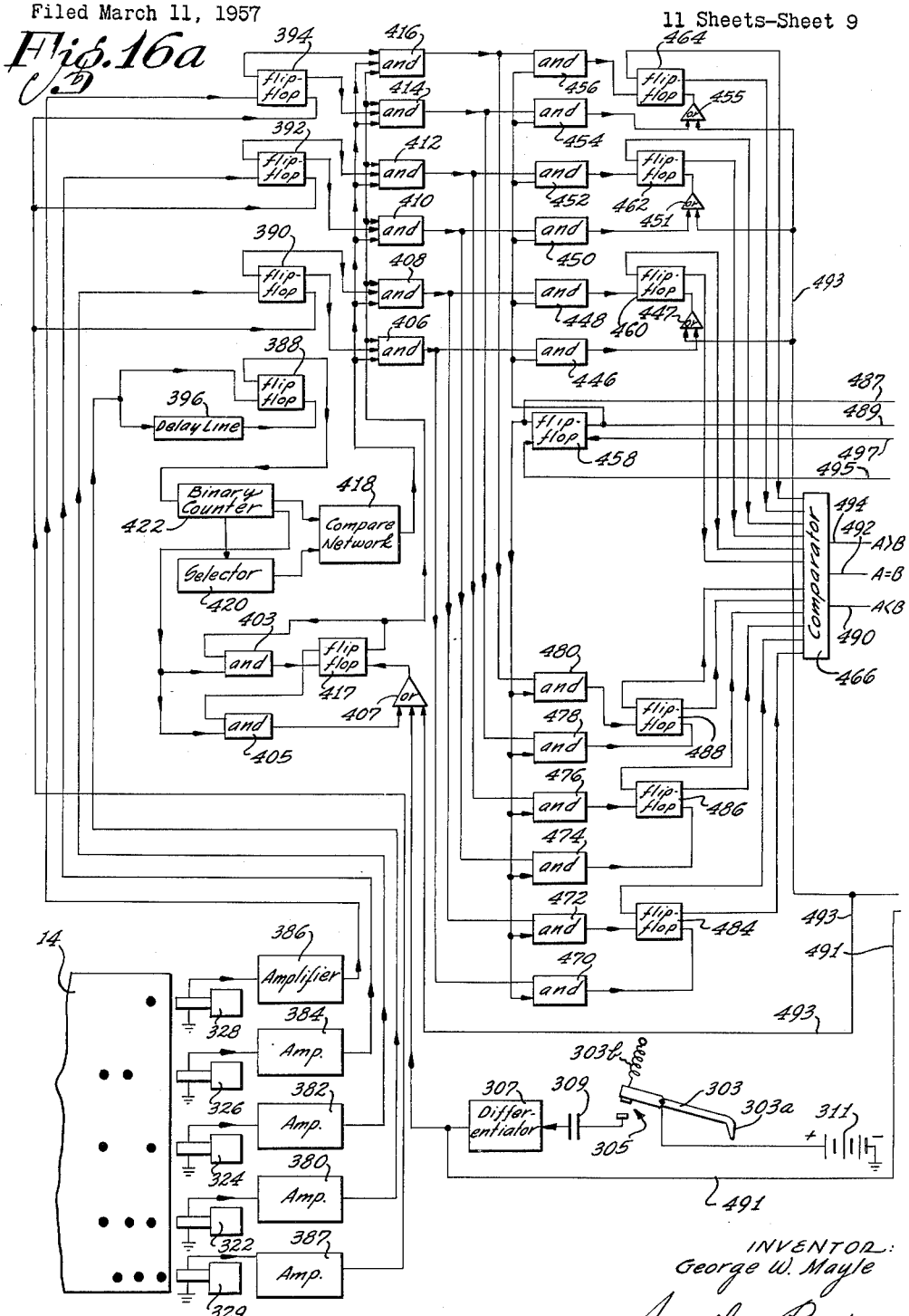

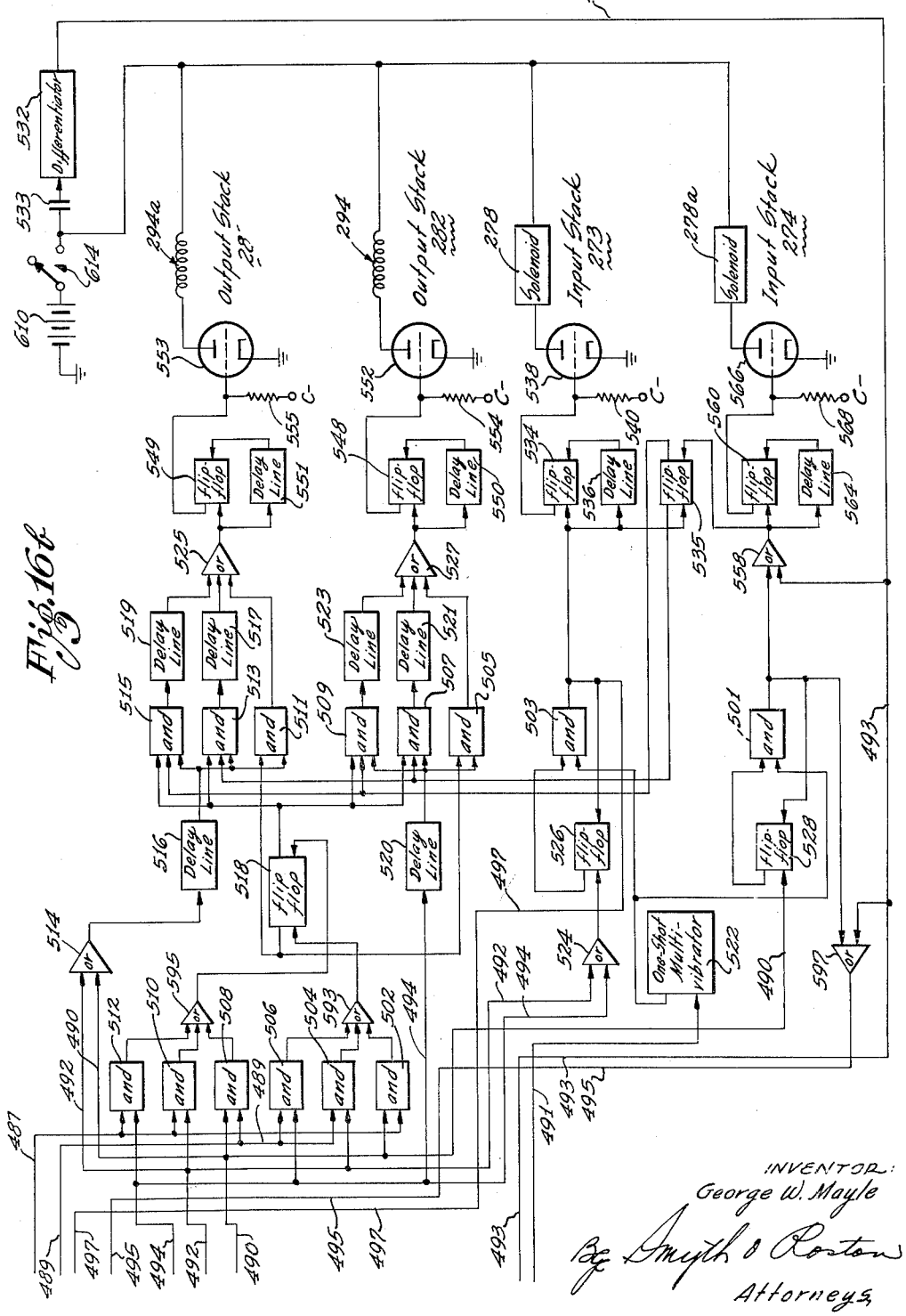

June 13, 1961

G. W. MAYLE 2,988,217

DATA PROCESSING SYSTEM

Filed March 11, 1957

INVENTOR:
George W. Mayle
By Smyth & Roston
Attorneys

United States Patent Office

2,988,217
Patented June 13, 1961

2,988,217
DATA PROCESSING SYSTEM
George W. Mayle, Canoga Park, Calif., assignor to The Magnavox Company, Los Angeles, Calif., a corporation of Delaware
Filed Mar. 11, 1957, Ser. No. 645,266
12 Claims. (Cl. 209—72)

The present invention relates to data processing systems and apparatus, and, more particularly, to an improved system and mechanism in which data is recorded for subsequent processing at the point at which the business is actually transacted.

A pressing need has arisen in complex present day commercial operations for a simple system which will enable pertinent information concerning a sale or any other business transaction to be recorded at the point at which the transaction actually occurs. There is also a pressing need to have such recording made on a medium which is suitable for convenient sorting and processing at a subsequent time.

One prior art system of this general type utilizes a punched tape. A recording mechanism is provided in this prior art system at the various transaction points, and this mechanism includes a paper tape which is moved continuously through the mechanism. The paper tape is punched in accordance with a predetermined code for each transaction recorded by its associated mechanism. Existing punched tape systems require that the data recorded on the various tapes be transferred from the tapes to another medium before that data can be processed. The punched tape systems are, therefore, somewhat complicated and involve somewhat expensive equipment. Moreover, these systems are subject to cumulative errors because the original tape record must be transferred to another medium prior to processing.

Other prior art systems and mechanisms utilizing data from the points of transaction have included pre-punched cards and tapes. However, these systems do not permit information to be recorded at the actual point of transaction and so do not provide actual transaction information. The transaction information must be manually written or otherwise recorded on the cards or tags and subsequently transcribed to an appropriate medium for data processing. Moreover, the pre-recorded cards or tags, in many instances, must be transcribed to other media for data processing.

The present invention, unlike the prior art arrangements referred to above, provides a system in which transaction data is actually recorded at the point of transaction upon media that are themselves suitable for data processing. This recording is preferably a simple printing operation, which will be described, so that the necessary equipment at the various transaction points may be relatively simple and inexpensive.

In accordance with the invention, the transaction data is printed or otherwise recorded at the transaction point, on a suitable medium that is later cut into discrete cards for data processing, or on the discrete cards themselves. As will be described, these cards are of appropriate form to be sorted, collated, or otherwise processed in accordance with the data on the cards.

Many business operations involve the recording of a large volume of transactions, with each of the transactions being relatively uncomplicated and capable of being represented by data utilizing a relatively few characters. The present invention finds perhaps its greatest utility in such an appliction. In accordance with the concept of the invention, this application would require a large number of cards but with a low density of data characters on each card.

The system of the invention is most susceptible for the recording of transactions of low character density on relatively small, inexpensive discrete cards, as noted above. As was also noted, the recording may be made on a continuous medium that is later formed into such discrete cards. The cards may themselves form the entire transaction document, or they may be part of a larger document and later separated from that larger document for data processing. This will be described in detail subsequently.

The system to be described makes possible the handling of transaction data and the processing of such data at a cost considerably less than the cost of handling techniques presently known to the art. As noted above, the system probably finds its greatest utility in situations in which the number of records to be recorded is large, the amount of data contained in each record is small. The system is also most useful in situations in which the data recorded must be sorted with respect to one or more categories. The system is also useful in situations where the data need be read only a small number of times in the course of the handling procedure. The system is also advantageous where the number of record-producing machines is large so that the cost of such recording machines is a major consideration.

Typical applications for the system of the invention are, for example, ticket accounting for various types of transportation, such as airline, train, bus, etc.; sales recording; credit accounting; timekeeping; inventory control; bank deposit recording; wholesale warehouse ordering; telephone toll recording; and many other types of business and organizations.

As noted above, the record cards of the present invention may form a portion of a larger document. For example, each of the record cards may be part of a preprinted form. These forms may generally contain a printed format of a usual nature and with perhaps a small amount of information pre-recorded in coded dot form for utilization in the system constituting this invention. Then, additional data concerning the transaction is recorded in the coded dot form on the cards at the point of action, and the cards containing the coded dots are separated from the printed forms. The cards are then ready to be sorted into appropriate categories for data processing.

Figure 4:
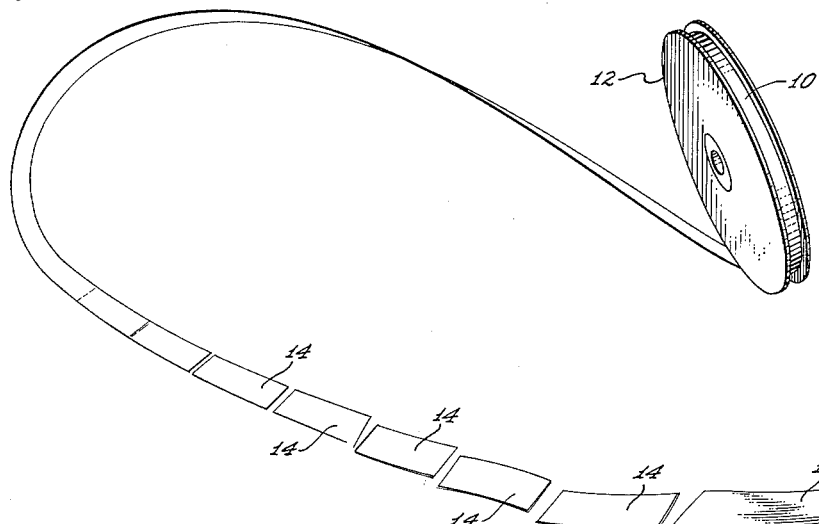
FIGURE 4 is a schematic representation of the cards of FIGURE 3 in the form of a continuous roll, such that transaction data may be recorded on the continuous roll at the transaction point, with the roll being cut at that point or later into the illustrated individual discrete cards.
Figure 5:
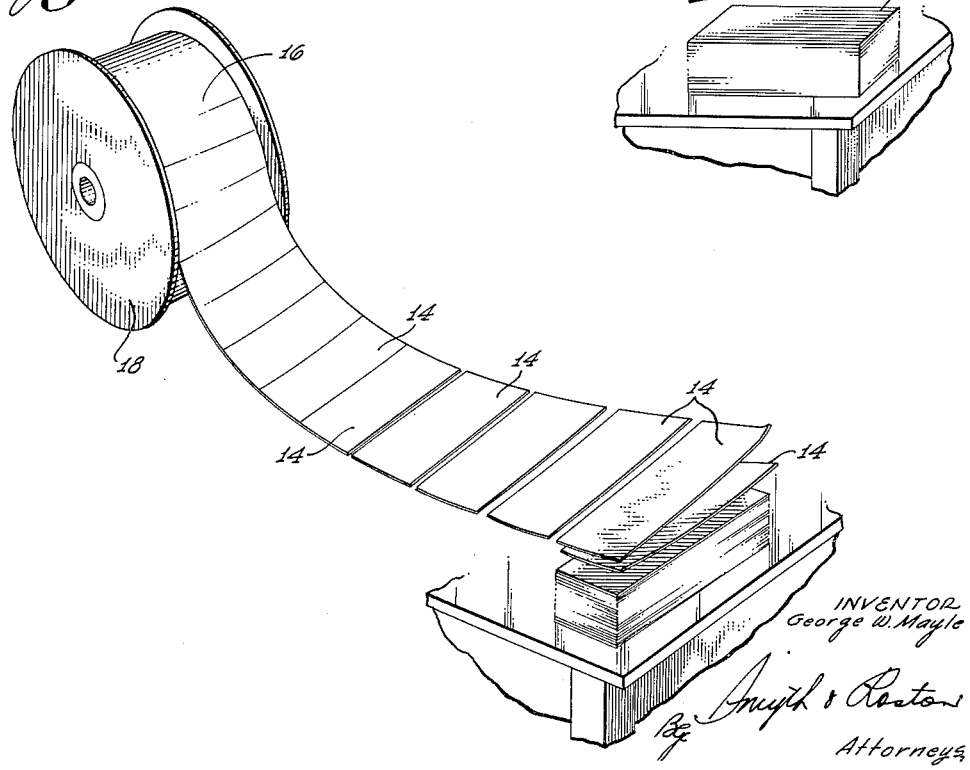
Figure 10:
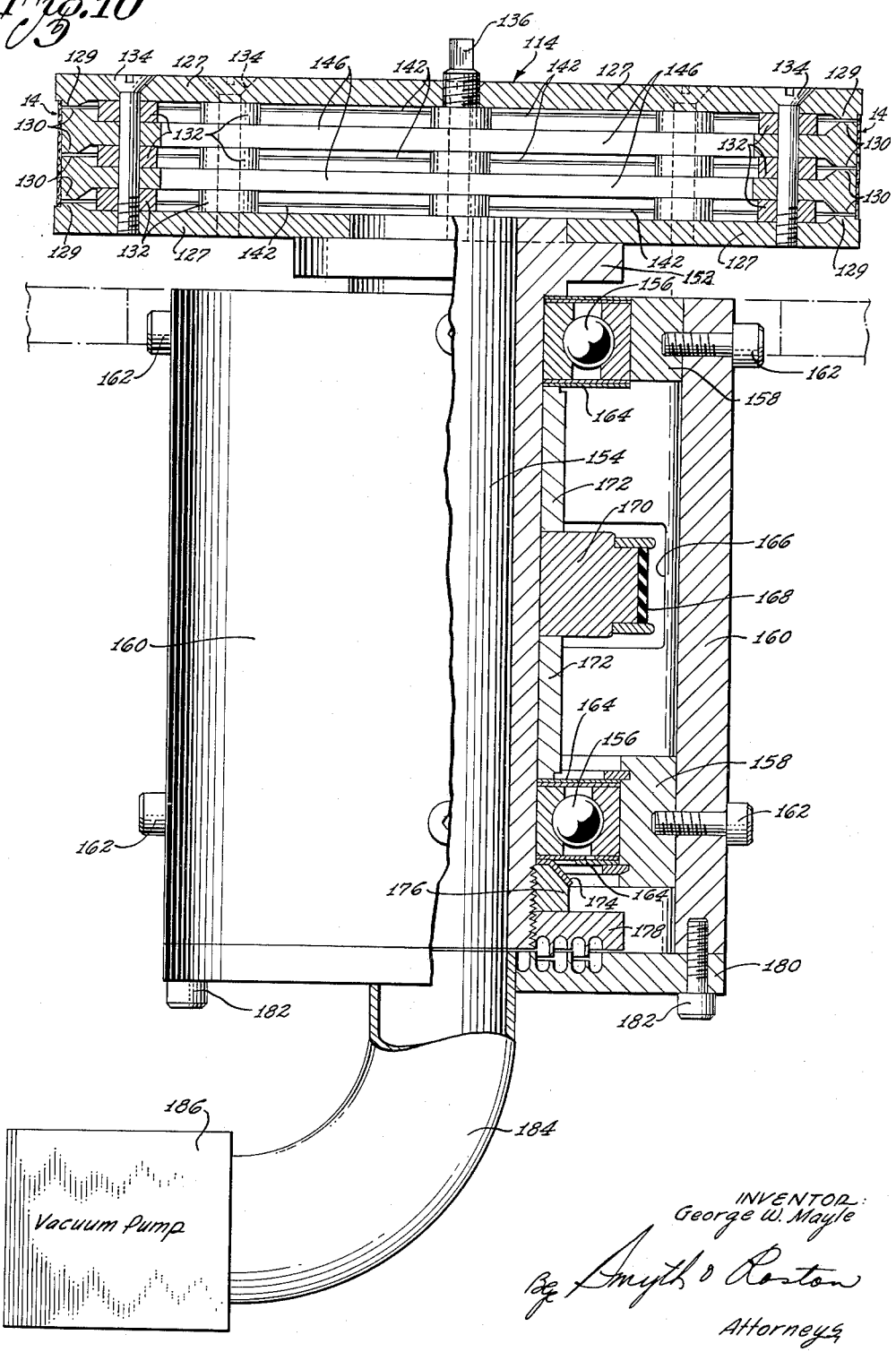
Figure 11:
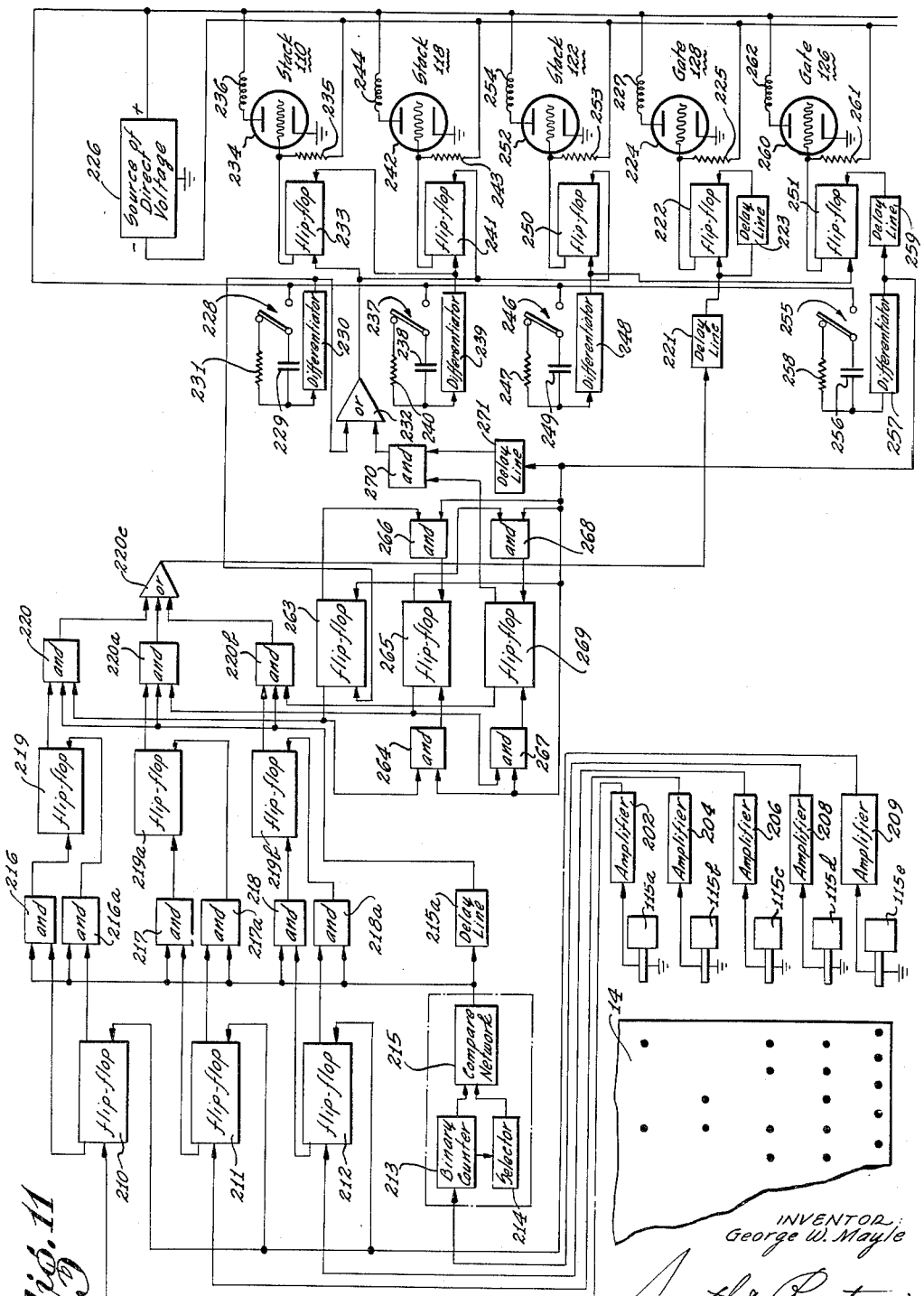
Figure 17:
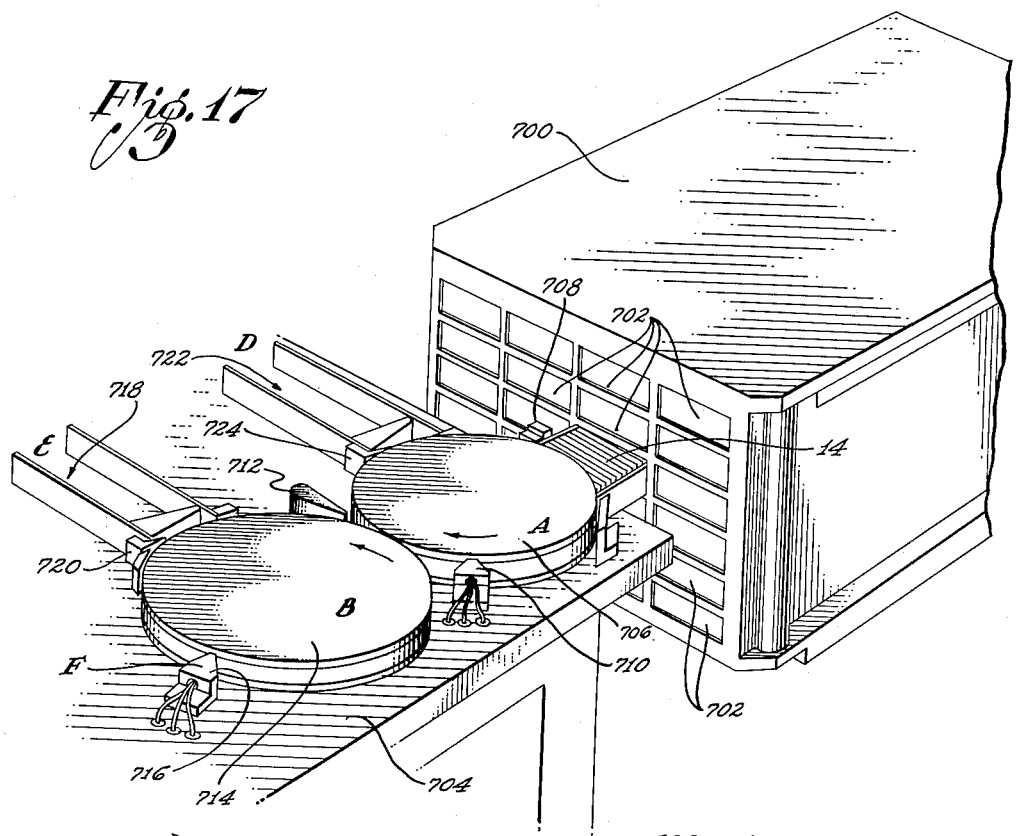
Figure 18:
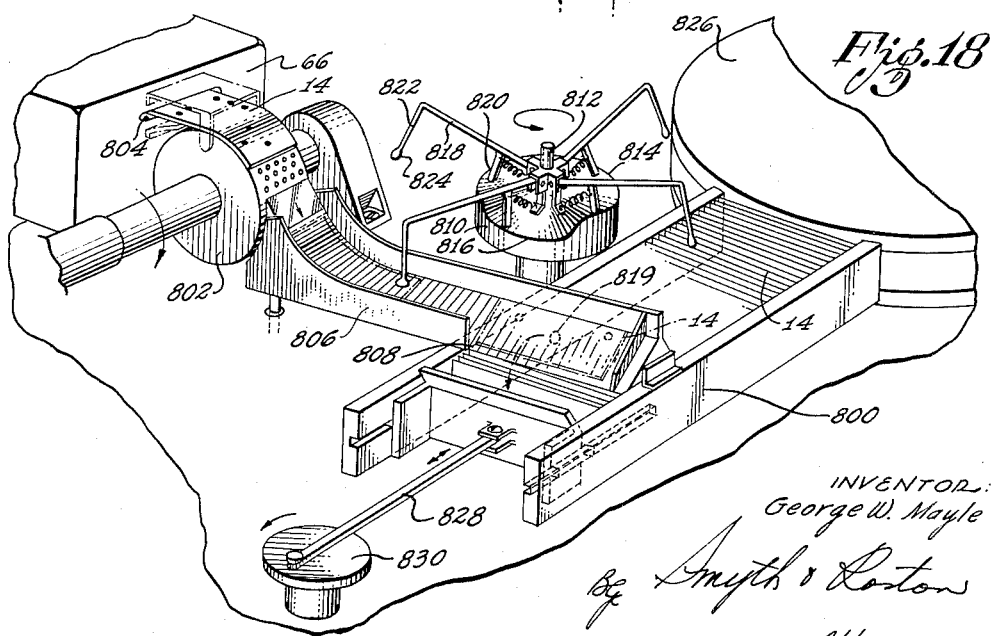

FIGURE 5 also shows the cards in the form of a continuous roll at the transaction point, the recording being in parallel in the latter instance and in series in the representation of FIGURE 4;

FIGURE 6 shows the cards as part of a larger printed document, it being intended that appropriate transaction data be recorded in coded dot form on the individual cards at the transaction point and that these cards be either then or later separated from the larger printed form;

FIGURE 7 is a perspective view of suitable apparatus which is manually operable to record the transaction data in coded dot form on the discrete cards at the point of transaction, the particular mechanism illustrated in FIGURE 7 being appropriate for use in situations where each of the actual coded dot cards forms part of a larger pre-printed document;

FIGURE 8 shows in perspective a suitable automatic mechanism for recording point-of-transaction data on a continuous medium in a roll similar to that shown in FIGURE 4 and for simultaneously or subsequently cutting the medium into a plurality of discrete cards which are suitable for data processing;

FIGURE 9 is a schematic representation of apparatus suitable for sorting into any desired order the discrete cards bearing the transaction information in coded dot form, this mechanism including a plurality of vacuum drums and associated mechanisms for transporting the cards on the peripheral surfaces of the drums and for handling the cards in a manner to be described;

FIGURE 10 is a sectional view of one of the vacuum transport drums and is taken substantially on the line 10—10 of FIGURE 9;

FIGURE 11 is a suitable electrical system for controlling the sorting mechanism shown in Figure 9;

FIGURE 12 is a schematic representation of apparatus suitable for collating the information cards in any desired manner after such cards have been sorted as by the mechanism shown in FIGURE 9;

FIGURE 13 is a top plan view, partly in section, somewhat schematically illustrating on an enlarged scale an input stack forming a part of the apparatus shown in FIGURE 11 and vacuum transfer means and also illustrating in block form an electrical system for controlling the operation of the transfer means;

FIGURE 14 is a top plan view on an enlarged scale of an output stack and transfer means forming a part of the apparatus shown in FIGURE 12 and also illustrating in block form an electrical system for controlling the operation of the transfer means;

FIGURE 15 is a sectional view of the transfer means shown in FIGURE 14 and is taken substantially on the line 15—15 of FIGURE 14;

FIGURES 16a and 16b illustrate, mostly in block form, a suitable electrical control system for the apparatus shown in FIGURE 12; and FIGURE 17 illustrates suitable apparatus for further processing the cards after they have been sorted by the apparatus shown in FIGURES 9 and 11 and after they have been collated by the apparatus shown in FIGURES 12, 16a and 16b;

FIGURE 18 is a perspective view somewhat schematically illustrating one embodiment of apparatus for automatically transferring the information cards into an input stack after the cards have been formed from the tape;

FIGURE 19 is a fragmentary perspective view somewhat schematically illustrating apparatus for advancing the tape past the recording apparatus shown in FIGURE 8 in synchronism with the recording of information on the tape; and FIGURE 20 is a fragmentary perspective view somewhat schematically illustrating apparatus for automatically cutting the tape into cards every time that the tape has been advanced a particular distance past the recording apparatus shown in FIGURE 8.

Figures 1, 2, 3:
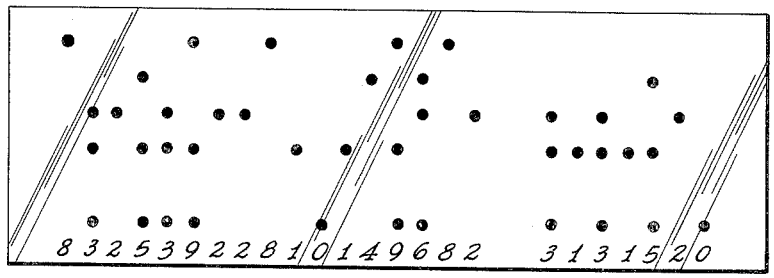
FIGURES 1 and 2 are tables representing an appropriate dot coding system that can be used in recording data on the cards of the present invention, FIGURE 1 illustrating a suitable dot code for representing a series of numbers from zero to 9 and FIGURE 2 illustrating a code for representing the entire alphabet.
FIGURE 3 shows on an enlarged scale a typical discrete card having transaction data recorded in coded dot form on its face, the coding being of the type to be described in conjunction with FIGURES 1 and 2.

With reference now to the table of FIGURE 1, the portion of each of the cards which is to receive numerical point of transaction data may, for example, be divided into three columns, as shown. The first column is known as the "parity" column and it receives a recording whenever all the recordings in its row properly add up to an even number. The purpose of the parity recording is to serve as an automatic check and the use of this is well known. This parity recording provides that the recordings of any roll will always be odd, and an even number of recordings for any row indicates that an error has been made. Systems have been devised and are in operation that are capable of automatically determining from this parity recording format whether or not a recording error has been made.

The columns in a third group on each card are usually designated as the "field" columns. These columns may receive, for example, recordings in any of four columns indicated in FIGURE 1 as "a," "b," "c" and "d." The actual number represented by the code may also be directly printed on the card, as illustrated in the extreme left-hand column.

Then, for a representation of "zero," no recording may be in the field columns, but a recording may be made in the parity column so that the total recordings will be odd. For a representation of the decimal value "1," a recording may be made in the "d" column of the field columns; for a representation of the decimal value "2," a recording may be made in the "c" column; and for a representation of the decimal value "3," recordings may be made in both the "c" and "d" columns. It will be noted that the recordings for the number "3" will require a parity recording so that the total recordings in that row be odd. Such recordings may represent binary indications of "1" and the lack of any recordings may represent binary indications of "0."

Likewise, the decimal value "4" may be represented by a recording in the "b" column, "5" by recordings in the "b" and "d" columns, "6" by recordings in the "b" and "c" columns, and so on. In each instance, a parity recording is made in any row where the number of recordings is even so that the total recordings will be odd.

The columns in the second group on each card are known as the "zone" columns. These columns are normally not used when it is merely desired that the date refer to numbers from zero to 9; since such numbers may be designated in the columns in the third group. However, it is possible for the numbers, for example, of a first series from "0" to "4" to be represented by one zone and for the numbers of a second series from "5" to "9" to be represented by recordings similar to those of the first series but by another zone. With such an arrangement, recordings would also be made in the zone columns. By including the "zone" columns, alphanumeric codings representing both numbers and letters may be individually designated without increasing the number of different designations in the third columns. For example, numbers from "0" to "9" may be indicated by different designations in the third columns when no binary indications of "1" are provided in the zone columns. The same designations in the third columns may indicate "A" to "I" when an indication of "1" is provided in the first one of the "zone" columns. These same designations may represent the letters "J" to "R," inclusive, when an indication of "1" is provided in the second of the "zone" columns. The remaining letters of the alphabet may be represented when binary indications of "1" are provided in both the first and second of the "zone" columns.

In the illustrated embodiments, the recordings are shown as in the form of printed dots at the various positions and in the various columns of the card. However, these recordings may be in any suitable form. For example, they may be in the form of printed bars or rectangles, or the like.

The recordings on the various cards may be made by any suitable printing process and by the use of printing ink. When printing ink is used, the cards may be subsequently processed by optical sensing. Alternately, magnetizable ink may be used in the printing process so that the recorded dots or other indicia may be composed of magnetizable material. Then, prior to processing, the cards are passed through a magnetic field, and the presence or absence of a dot (or other form of magnetizable recording) is represented by the resulting presence or absence of a magnetized area.

FIGURE 2 shows a code table for use when the data to be represented on the cards or on a portion of the cards is alphabetical. The coding is generally similar to that of FIGURE 1, with the exception that the zone columns are used. The letters "A" to "I" are assumed to be in the first zone as represented by a recording in the column at the right end of the zone. The field coding for this first zone proceeds in the manner similar to that of FIGURE 1.

Then, the letters "j" to "r" are assumed to be in a second zone as indicated by recordings in the left zone column. The field recordings of the first zone may then be repeated in the same sequence for this second zone. Finally, the letters from "s" to "z" are assumed to be in a third zone as represented by recordings in both zone columns. For this third zone, the field recordings again proceed in the same sequence as for the other zones.

It is evident, therefore, that a simple coding arrangement can be made so that the dots or other indicia recorded on the cards represent either a desired number, or desired sensible information such as a person's name, his address or other pertinent and relevant information.

An information card is shown on a somewhat enlarged scale in FIGURE 3. As noted above, the transaction data is recorded at the transaction point onto a medium which then, or at a later time, is formed into individual and discrete cards. Each of these cards may, for example, measure 1" x 3" x .007". The cards may conveniently be formed of cardboard or cardboard stock.

As shown in FIGURE 3, the character can be printed on the card together with the coded dots representing that character. In the card itself, the various columns described in FIGURES 1 and 2 are disposed horizontally. Therefore, the lowermost row of dots represent the column for parity recordings. The next two rows are blank in the illustrated embodiment and represent the columns for zone recordings. Then, the uppermost four rows represent the columns for field recordings. Then, for each position of the card, there is a coded dot recording representative of a particular character and that character may itself be printed on the card at that position.

As noted above, the actual dot and character recordings are made at the point of transaction and represent pertinent transaction data. The card in the form illustrated in FIGURE 3 is now directly available for data processing. Such cards may first be sorted for any desired category in a manner to be described, or they may be collated or otherwise treated in a manner also to be described so that groups of cards may be automatically conditioned for further data processing.

It is sometimes convenient for the cards at the point of transaction to be in the form of a continuous roll. This roll may be conveniently mounted in an automatic, semi-automatic or manual recording machine. When the recording is to be serial, the cards may be in the form of a continuous roll such as is shown in FIGURE 4.

FIGURE 4 illustrates a roll 10 of a medium that is suitable for subsequent cutting into individual cards. The roll is supported in a suitable reel 12 which is appropriate to be mounted in a recording machine. The medium is then fed from the roll 10 through the recording machine, in a manner to be described, to receive the coded dot recording of the transaction data. It is then cut into the individual cards 14. This cutting is performed either at the transaction point or at a central station. The cards may then be stacked, as illustrated, and they are now ready for sorting, collating or other types of data processing.

The medium of FIGURE 4 is appropriate when the recording is to be made in series form. When the recording is to be made in parallel, the roll 16 of FIGURE 5 may be used. This latter roll is supported in an appropriate reel 18, and the medium (in like manner to the medium of FIGURE 4) may be cut into the discrete cards 14.

As noted previously, the cards of the present system may form a part of a larger document of any appropriate printed format. FIGURE 6, for example, shows a printed document 30 in the form of a sales slip. This sales slip also has a duplicate copy 32, which is intended in known manner to receive a carbon impression of inscriptions made on the original. The sales slip 30 has a card 34 attached to it and forming a portion of the original sales slip. A card 36 is also attached to the duplicate copy 32 and forms a part of that duplicate. Also, it is often desirable that a third card 38 be provided, with the cards 36 and 38 receiving carbon impressions of the recordings made on the original card 34.

Then, at the point of sale, the sales clerk completes certain blanks on the slip to provide in usual handwritten form information pertinent to the transaction. He also records other transaction data in coded dot form on the card portions 34, 36 and 38. This latter data, for example, may indicate the amount of the sale, the customer's name, identifying information concerning the point at which the transaction was made, and the date. The original copy may, for example, be maintained in the station's files, the duplicate may be given to the customer, and the separate card 38 may be sent to the central station for data processing for accounting and other purposes.

It should be pointed out, when magnetic printing is used, appropriate magnetic carbons should be used so that the duplicate cards 36 and 38 will also contain the coded dot data in magnetizable form. This, at least, should pertain to the card 38 which actually is to be processed.

Recording and transcribing may be performed in a suitable manner on the document of FIGURE 6 by inserting the document in a manual recorder such as that shown in FIGURE 7. This recorder may include a casing 40 having an opening 42 formed in its upper surface. The recorder may also include a magazine for holding the documents shown in FIGURE 6 in proper registry. The documents are held with the upper face of the upper document exposed through the opening 42 so that any appropriate handwriting inscriptions may be made on the document. When the recording is complete, a handle 44 is manually actuated to release the document through the slot 46 in one side of the casing.

The portion of the recording mechanism described in the preceding paragraph may be similar in its construction to the well known sales slip magazines in general use today.

The apparatus shown in FIGURE 7 also includes a keyboard 48 having a sufficient number of characters so that the required coded dot recording may be made. Each type bar associated with the individual keys of the keyboard 48 should be capable of printing both a character and a dot pattern representing that character. As shown in FIGURE 7, the keys in the keyboard 48 are arranged in a plurality of rows. The keys in each row correspond to the keys in the other rows. By providing a plurality of rows, the same information may be typed in each row to obtain a number such as "9999" or "6666."

The mechanism associated with the keyboard 48 is constructed in accordance with known techniques so that a plurality of type bars may be brought into position from the different rows to represent the entire coded dot pattern that is to be printed on the cards 34, 36, and 38. Then the lever 50 is pulled to effectuate the printing operation and to eject the cards from the recording operation after the printing operation. The cards 38 may be removed from each sales slip as it is ejected through the slot 46. Stacks of these cards may then be sent to a central station for further processing, as will be described subsequently. The typing of the code representing different bits of information may be accomplished in a manner similar to that disclosed in Hart Patent 2,110,862.

In the more elaborate installations, the recording on the various cards may be made automatically, as by the mechanism shown in FIGURE 8. Since the mechanism may be similar in its construction to known punched paper tape recorders, it probably need not be described in detail. The recorder, for example, may be similar to the typewriter tape punch mechanism presently being marketed by the International Business Machines Corporation, and designated by them as their Model Type 884. This mechanism need only be modified so that it will print rather than punch the coded dots on the medium and actually can even be used to punch the coded dots.

In the embodiment of FIGURE 8, the cards are in a roll form similar to that previously discussed in conjunction with FIGURES 4 and 5. The roll is supported in a reel 51 which, in turn, is mounted on a bracket 52 secured to the rear wall of the casing 53 of the automatic recorder. The roll is fed across the top of the casing through guides 56 and downwardly through the printer 58.

The recorder is controlled by an appropriate keyboard unit 60. The keyboard unit is coupled to the recorder through an electrical cable 64 and controls the recorder electrically in known manner. The keyboard unit is operated to record transaction data on the roll of cards in a manner similar to the prior art mechanisms. The data, however, is preferably printed on the cards as previously noted rather than punched.

The tape 54 may be advanced through a particular distance every time that information is recorded on the card by the printer 58. The tape 54 may be advanced through the particular distance by the apparatus shown in FIGURE 19. This apparatus may include a printer arm 70 (FIGURE 19) which is privoted toward the tape 54 to record a binary indication of "1" in a particular row such as the first row on the tape 54 every time that information is printed on the tape by the recorder. The printer arm 70 may be included in the printer 58 and is spring loaded as at 72 such that the arm will be returned to a position away from the tape after the binary indication of "1" has been recorded.

The movable arm of a switch 74 may be mechanically coupled to the printer arm 70 so as to produce a closure of the switch when the printer arm becomes actuated. The switch 74 may be included in a circuit with a solenoid 76 to obtain an activation of the solenoid when the switch becomes closed. The solenoid 76 may be provided with delay characteristics so that it can become activated only after the information has been recorded on the tape 54 by the printer 58. Upon the activation of the solenoid 76, a clutch 78 becomes actuated so that a motor 80 can drive the tape 54 through wheels and pulleys 82 and rollers 84. The rollers 84 are disposed in frictional relationship with the upper and lower surfaces of the tape to advance the tape. Apparatus for recording information on a medium, for advancing the medium after each recording and for cutting the medium is fully disclosed in Hart Patent 2,110,862.

A counter 86 is also adapted to become energized every time that a binary indication of "1" is recorded by the printer arm 70. When the counter 86 becomes energized, the count in the counter becomes advanced by an integer. For example, the count may become advanced from a decimal count of "3" to a decimal count of "4" when the printer arm 70 becomes actuated. The counter 86 may be constructed to produce an output signal every time that the count in the counter reaches a particular decimal value such as a value of "42." The counter 86 may be further constructed to return to a value of "0" for the initiation of a new count every time that the count reaches the particular value such as the value of "42." By way of illustration, the counter 86 may be formed from a plurality of flip-flops and a plurality of "and" networks connected in an interrelationship which would be known to a person skilled in the art.

The signals from the counter 86 are introduced to a solenoid 88 (FIGURE 20) to energize the solenoid. When the solenoid 88 becomes energized, it actuates an armature 90 in a downward direction. The armature 90 in turn drives a cutter blade 92 toward the tape 54 so as to cut the tape into cards of uniform length. The cutter blade 92 is pivotable as at 94 and is spring loaded as at 96 so as to be returned upwardly to a position away from the tape 54 when the solenoid 88 becomes de-energized. The blade 92 may be included in the chopper 66 schematically shown in FIGURE 8.

The information cards obtained from the manual apparatus shown in FIGURE 7 or from the automatic apparatus shown in FIGURE 8 are sorted and collated and generally rendered in an order appropriate for data processing at the central station. This sorting and collating may, for example, be carried out so as to place the cards in alphabetical order as to the various customers. Alternately, all the cards of a particular station may be grouped together for certain accounting purposes. In addition, the cards may be sorted as to amounts or as to dates, whichever is appropriate for the particular account or data processing function which they are to fulfill.

As they arrive at the central station, the cards may be sorted in a mechanism such as that described in copending application Serial No. 529,886 filed August 22, 1955, by Alfred M. Nelson et al. Such a mechanism is shown in FIGURE 9. In the embodiment shown in FIGURE 9, a drum 114 is rotatably mounted on a table top 112. Details of the drum 114 will be described in conjunction with FIGURE 10. The drum is so constructed that it receives a vacuum force at its peripheral surface of sufficient intensity to retain the cards on that surface and so that such cards may be transported by the drum. A card holding means or stack indicated generally at 110 is positioned on the table top 112 with its mouth adjacent the peripheral surface of the rotatable drum 114. This stack 110 is designed to support a plurality of the cards in a stacked condition, with the individual cards extending in a generally vertical direction, and with their lower edges resting on the table top 112.

The stack 110 has a transfer mechanism 111 positioned at its mouth, and this transfer mechanism is controlled to feed the cards from the stack 110 to the periphery of the drum 114. The transfer mechanism 111 may be constructed in a manner similar to that described in detail and claimed in copending application Serial No. 538,111, filed October 3, 1955, now Patent 2,842,362, by Robert M. Hayes et al. As fully described in that application, the transfer mechanism is so constructed that, in one operating condition, it causes the cards to be fed successively from the stack 110 to the periphery of the drum 114. In a second operating condition of the transfer mechanism, however, cards on the periphery of the drum 114 are stripped and deposited in the stack 110.

The drum 114 is rotatable in a clockwise direction. A transducer means 115 is mounted on the table top 112, and the transducer is displaced slightly from the mouth of the stack 110 in the direction of rotation of the drum. The transducer means 115 is disposed in operative relationship with the cards transported on the periphery of the drum 114 to sense the information recorded on the magnetic dots formed on the cards in the described manner.

Transducers such as magnetizing means 117 are also mounted on the table top 112. The magnetizing means is interposed between the transducer 115 and the stack 110, and its function is to magnetize the magnetic dots on the cards so that the transducer can sense the presence or absence of such a dot.

A second vacuum transport drum 116 is rotatably mounted on the table top 112 for counter clockwise direction. The drum 116 is mounted in contiguous relationship with the drum 114, and it may be similar in its constructional details to the drum 114.

A second card holding means or reversible stack indicated generally at 122 is mounted on the table top 112 with its mouth disposed adjacent the periphery of the drum 116. The stack 122 has a transfer mechanism, indicated generally as 124, mounted adjacent its mouth. The transfer mechanism 124 may be similar to that described and claimed in copending application Serial No. 538,111 (U.S. Patent 2,842,362) and may be generally similar to the transfer mechanism 111 associated with the stack 110. That is, the transfer mechanism 124 may be established in a first operating position in which cards on the periphery of the drum 116 are stripped from its periphery and deposited in the stack 122. In another operating condition of the transfer mechanism 124, cards in the stack 122 are continuously transferred in succession to the periphery of the drum 116.

A pair of pneumatic gates 126 and 128 are mounted on the top of the table 112 and are directed respectively at the peripheral surfaces of the drums 116 and 114. These gates may have a construction similar to that disclosed in copending application 562,154, filed January 30, 1956, by Stuart L. Peck et al. and may be similar in their constructional details to a lifting mechanism which is to be described in conjunction with FIGURES 14 and 15.

Appropriate solenoid valves control the flow of air to the gates 126 and 128. When either one of these valves is energized, its corresponding gate emits a stream of air to strip a card from the corresponding vacuum transport drum and cause such card to be transferred to the other drum. It will be noted that the gate 128 is positioned to direct its stream of air tangentially on the periphery of the drum 114. This stream causes a card transported on the drum 114 to have its leading edge lifted from the peripheral surface of that drum so as to come under the influence of the vacuum pressure at the periphery of the drum 116 and to be transferred to the latter drum. The gate 126, on the other hand, directs its stream of air in a direction tangential to the periphery of the drum 116 to cause the leading edge of a card on that drum to be lifted so as to bring the card under the influence of the drum 114.

A card holding means or reversible stack 118 is also mounted on the table top 112. This latter stack has its mouth disposed adjacent the drum 114 in a position displaced slightly from the gates 126 and 128 in the direction of rotation of that drum.

Like the stack 110, the stack 118 is constructed to support the cards in a stacked condition, with the individual cards extending generally in vertical planes and with their lower edges resting on the table top 112.

A transfer mechanism 119 is positioned adjacent the mouth of the stack 118. This transfer mechanism may be similar to the transfer mechanism 111 and 124, and it functions either to transfer cards from the drum 114 to the stack 118 or to return the cards from the stack 118 to the periphery of the drum 114.

The constructional details of the drums 114 and 116 may be as shown in FIGURE 10. However, these drums may be constructed in any convenient manner. For example, the vacuum transport drums may be constructed in the manner described and claimed in copending application 600,975, filed July 30, 1956, now Patent No. 2,883,189, by Loren R. Wilson.

As shown in detail in FIGURE 10, the drum 114 includes a pair of external plates 127 spaced from one another in parallel horizontal planes. These external plates define a housing and have axially inwardly disposed lip portions 129 at their peripheries. A second pair of plates 146 are disposed within the housing defined by the external plates 127 and are in spaced parallel relationship with each other and with the external plates. The plates 127 are fixedly positioned with respect to one another and to the plates 146 by a series of studs 134 extending through the plates and by spacers such as the spacers 132 mounted on the studs.

A plug 136 extends into a threaded socket at the center of the external plates 127. The radius of the plates 146 is slightly less than that of the external plates 127 by a distance corresponding substantially to the thickness of the information cards 14 so as to form a channel around the periphery of the drum for holding these cards on that periphery. Annular flange portions 130 extend axially from both of the plates 146 at the periphery of these plates. The flange portions 130 are separated from one another and from the lip portions 129 on the plates 127 by relatively small distances so as to define a series of slots 142. The slots 142 communicate with suction passageways formed between pair of adjacent plates 127 and 146 by the spacers 132.

The drum 114 engages a hollow shaft 154 in friction fit and the drum is disposed against an annular collar 152 provided at one end of that shaft. Bearings 156 are provided at opposite ends of the shaft 154. The inner races of the bearings 156 are mounted on the shaft and the outer races are disposed against bushings 158 secured to a housing 160 as by studs 162. Seals 164 are disposed at opposite ends of the bearings to prevent leakage of the lubricant. An opening 166 is provided in the housing 160 at a position between the bearings 156. The opening 166 receives a belt 168 which extends around a pulley 170 secured to the shaft 154. A suitable motor (not shown) drives the belt 168 so as to rotate the shaft 154.

The bearings 156 and the pulley 170 are maintained in fixed axial positions on the shaft 154 as by a pair of sleeves 172 mounted coaxially with the shaft end respectively interposed between the pulley and the bearings. The bearings, pulley and sleeves are held in fixed position on the shaft 154 as by a lockwasher 174 and a nut 176. The nut 176 is adapted to be screwed on a threaded portion of the bottom of the shaft 154.

A sealing disk 178 is also screwed on the threaded portion of the shaft 154 below the nut 176. The sealing disk 178 operates in conjunction with a bottom plate 180 to prevent air leakage between the interior of the housing 160 and the interior of the hollow shaft 154 due to the pressure differential between the interior of the housing and the interior of the shaft.

The plate 180 is secured to the housing 160 as by studs 182. A hollow conduit 184 extends into a central aperture in the plate 180 in push fit with the plate so as to communicate with the hollow shaft 154. In this manner, air can be exhausted from the hollow interiors of the shaft 154 and of the conduit 184 by a vacuum pump indicated in block form at 186. Therefore, a vacuum pressure can be provided through these interiors to the slots 142 at the periphery of the drum 114 to hold the information cards in fixed positions on the periphery as the drum rotates.

The control system for the apparatus of FIGURE 9 is shown in FIGURE 11. As noted above, this control system is similar to that shown and described in copending application filed by Robert M. Hayes et al. The purpose of this control system is to cause the mechanism of FIGURE 9 to sort a stack of cards 14 inserted in the card holding means 110 of FIGURE 9. This sorting is carried out in accordance with any desired programming. For example, the cards may be sorted alphabetically as to customers, or they may be sorted as to dates, stations, or in any other manner. One type of sorting apparatus is disclosed in co-pending application Serial No. 529,886, filed August 22, 1955, by Alfred M. Nelson et al.

The control system of FIGURE 11, for example, may be set to process a selected position on each card and to sort the cards alphabetically or numerically in accordance with the letter or number recorded at that particular position. For example, when it is desired to sort the cards in the stack as to dates, the system of FIGURE 11 is adjusted so that in a first pass it successively senses a position on each card bearing a digit relating to date. The cards are then placed in numerical order insofar as these digits are concerned. For the next pass, another digit on each card relating to date is sensed, and the cards are sorted as to this latter digit. Then, at the end of a series of passes, the cards in the stack 110 become sorted in a numerical order with references to dates. By the same process the cards in the stack 110 may be sorted and placed in alphabetic or numerical order insofar as other data on them is concerned.

To perform the sorting operation, the cards 14 are first successively fed from the stack 110 of FIGURE 9 to the periphery of the drum 114. The cards pass in succession past the magnetizing means 117 so that their magnetic dots may be magnetized. The least significant digit at the first selected position as represented by the lowest row of dots in the field area is then read by the transducer means 115. If this digit is "0," as represented by the absence of a magnetized dot, the corresponding card is transferred to the drum 116 and deposited in the output stack 122. On the other hand, if the least significant digit at the particular position is "1," as represented by the presence of a magnetized dot, the corresponding card is deposited in the output stack 118. All the cards deposited in the stack 118 are subsequently returned to the stack 110 in succession, and then the cards deposited in the stack 122 are successively returned to the stack 110.

The cards now are again fed from the stack 110 to the periphery of the drum 114, and the second least significant digit on each card at the particular position as represented by the next row of dots in the field area is read. Again the "0's" (as represented in each instance by the absence of a magnetized dot) are stacked successively in the stack 122 and the "1's" (as represented in each instance by the presence of a magnetized dot) are stacked successively in the stack 118. The cards so deposited in the stack 118 are again returned in succession to the stack 110, followed by the cards so deposited in the stack 122. These cycles of operation are continued automatically for each significant digit of the number at that particular position, and at the conclusion of the final cycle, the cards become stacked in numerical order in the stack 110 insofar as the respective digits at the first selected position of the cards are concerned.

The first particular selected position to be processed, in the manner described above, may correspond, for example, to the lesser significant digit corresponding to days. The cards are then processed in a second series of operational cycles with the selected position to be processed being changed to correspond to the greater significant digit pertaining to days. These cycles of operation are continued with the selected position to be processed being shifted at the termination of each group of cycles to correspond to the lesser significant digit pertaining to months, then to the greater significant digit pertaining to months; and then successively to the lesser and greater significant digits pertaining to years. The cards at this point are caused to be fully sorted and they become stacked in numerical order with respect to their dates. As noted above, similar processing can be effected to sort the cards into alphabetical or into any other desired order.

The sorting described above may be seen from a particular example. For example, it may be desired to sort cards having binary values of "00," "11," "10" and "01," where the least significant digit is at the right. The sorting would be accomplished on the basis of having numbers with binary values of "0" become deposited in one output stack and having numbers with binary values of "1" become deposited in a second output stack. On the first pass, the second digit would be tested. This would cause the cards having the numbers "11" and "01" to become deposited in one output stack and the cards having numbers "00" and "10" to become deposited in the other output stack.

The cards would then be returned to the input stack in the relative order of "11," "01," "00" and "10." In the second pass, the most significant digit would be tested. This would cause the cards having values of "11" and "10" to become deposited in one output stack and the cards having values of "01" and "00" become deposited in the other output stack. The cards from the first output stack would then be returned to the input stack before the cards from the second output stack so that the cards would have an order of "11," "10," "01" and "00" in the input stack.

As noted above, this sorting may be achieved by means of the control system of FIGURE 11. As shown in FIGURE 9, the cards are first magnetized by the magnetizing means 117 so that the dots of magnetic material recorded thereon are all magnetized. The preceding and subsequent discussion presumes that the dots are recorded on the cards 14 by printing them by means of an ink composed of magnetizable material. Such inks are well known. If so desired, and as noted previously, printing ink may be used and the transducer means 115 may be an optical type of transducer. For the latter arrangement, the drum 114 may be conveniently made transparent and a suitable light beam may be directed through the drum and through the cards onto the transducer 115. The printed dots then interrupt the light beam so that the transducer may generate electrical control signals representative of the presence or absence of the dots. Light may also be reflected from the drum instead of being transmitted through the drum such that the amount of light reflected at any instant may be dependent upon the presence or absence of printed data.

After being magnetized by the transducer means 117, the cards are passed to the transducer means 115 of FIGURE 9, such transducer means being represented in FIGURE 11 by a group of transducer heads 115a, 115b, 115c, 115d, and 115e. These heads scan respective rows of magnetized dots on each card. It should be pointed out that more or less heads can be used depending upon the number of rows of dots used in the field area of the cards in any particular system.

The head 115d scans a row of magnetized "clock" dots not previously described. This row may be disposed below the lowest row of the field area. The row in question contains a dot for each position of the card, and it permits the production of clock pulses in a manner to be described. The head 115e scans a series of magnetized dots, which also have not been previously described, and which may conveniently be disposed in a lower row of each card and displaced slightly ahead of each clock dot for reasons to be described. The heads 115a, 115b, and 115c scan corresponding rows of dots in the field area of each card, three such heads being shown although four would be required to scan the field rows of the cards of FIGURE 3.

The heads 115a, 115b, 115c, 115d, and 115e are connected respectively to a series of amplifiers 202, 204, 206, 208 and 209. The amplifiers 202, 204 and 206 are respectively connected to the left input terminals of a corresponding series of flip-flops 210, 211, and 212. The amplifier 209 is connected to the right input terminals of these flip-flops. The amplifier 208 is connected to a binary counter 213. The binary counter, in turn, is connected to a manually adjustable selector 214 which is in turn connected to a compare network 215.

The binary counter 213 is constructed in known manner and comprises a series of flip-flops which are interconnected in a manner well understood to the art. The flip-flops assume a different operational pattern for each input pulse introduced to the binary counter 213. The selector 214 comprises a series of switches which are manually adjustable to match any selected pattern of the flip-flops in the binary counter 213. Only when the pattern of the flip-flops in the binary counter matches the manual setting of the switches in the selector is the compare network 215 conditioned to translate an output pulse. By this arrangement, the selector 214 can be adjusted to cause the compare network 215 to produce an output pulse whenever any desired one of the vertical columns on the card (corresponding to a particular position on the card) is to be processed. Further details of the arrangement of the components 213, 214 and 215 may be found in copending application Serial No. 566,404, filed February 20, 1956, by Jerome B. Wiener and particularly with reference to FIGURES 7 and 9 of that application. Since the stages 213, 214 and 215 effectively operate to compare two numbers, the comparators disclosed in Edwards Patent 2,615,127 and Woolard Patent 2,641,696 may also be used.

The left and right output terminals of the flip-flop 210 are connected respectively to an "end" network 216 and to an "and" network 216a. Likewise, the left and right output terminals of the flip-flop 211 are connected respectively to a pair of "and" networks 217 and 217a. In like manner, the left and right output terminals of the flip-flop 212 are connected respectively to "and" networks 218 and 218a. The output terminal of the compare network 215 is connected to each of the "and" networks 216, 216a, 217, 217a, 218, 218a.

The "and" network 216 is connected to the left input terminal of a flip-flop 219, and the "and" network 216a is connected to the right input terminal of that flip-flop. The "and" network 217 is connected to the left input terminal of a flip-flop 219a, and the "and" network 217a is connected to the right input terminal of that flip-flop. Likewise, the "and" networks 218 and 218a are connected respectively to the left and right input terminals of a flip-flop 219a.

The respective right output terminals of the flip-flops 219, 219a and 219b are connected respectively to a series of "and" networks 220, 220a and 220b. The compare network 215 is connected to a delay line 215a whose output terminal is connected to each of the "and" networks 220, 220a and 220b.

The output terminals of all the "and" networks 220, 220a and 220b are connected to an "or" network 220c. The "or" network 220c is connected to a delay line 221, which, in turn, is connected to the left input terminal of a flip-flop 222. The delay line 221 is also connected to a delay line 223 whose output terminal is connected to the right input terminal of the flip-flop 222.

The left output terminals of the flip-flop 222 is connected to the control grid of a triode 224. A resistor 225 connects the grid of the triode to the negative terminal of a source of direct voltage 226 which has a positive terminal and which also has a common grounded terminal. A solenoid energizing coil 227 connects the anode of the triode 224 to the positive terminal of the source 226. When this coil is energized, a solenoid-actuated valve in the air line to the gate 128 of FIGURE 9 is opened to introduce air pressure to that gate and cause it to perform its card-stripping function described previously. The cathode of the triode 224 is grounded.

The system includes a manually-operated start switch 228 which is of the single-pole, double-throw type and whose movable arm is normally biased into engagement with its upper contact. The lower contact of the switch 228 is connected to the positive terminal of the source 226. A capacitor 229 is connected between the movable arm of the switch 228 and the input terminal of a differentiator 230. A discharge resistor 231 connects the upper fixed contact of the switch 228 to the common junction of the capacitor 229 and the differentiator 230.

The differentator 230 is connected to an "or" network 232, which, in turn, is connected to the left input terminal of a flip-flop 233.

The left output terminal of the flip-flop 233 is connected to the control grid of a triode 234. A resistor 235 connects that control grid to the negative terminal of the source 226. The cathode of the triode 234 is grounded, and a solenoid coil 236 connects the anode to the positive terminal of the source 226. Whenever the coil 236 is energized, the transfer mechanism 111 associated with the input stack 110 is conditioned to cause cards to be fed successively from the stack 110 to the periphery of the drum 114. When this coil is not energized, the transfer mechanism 111 is conditioned to strip cards from the periphery of the drum 114 and to deposit such cards in the stack 110.

The input stack 110 includes a switch 237 which may be of the type manufactured by the Minneapolis Honeywell Company of Minneapolis, Minn., and referred to by them as a "Microswitch." The switch 237 is of the single-pole, double-throw type, and it is mounted adjacent the mouth of the input stack 110. Whenever there is a card in the input stack, the movable arm of the switch 237 is held by that card against the upper stationary contact. However, when the last card leaves the stack 110, the movable arm of the switch engages the lower stationary contact of the switch.

A capacitor 238 connects the movable arm of the switch 237 to a differentiator 239, and a discharge resistor 240 connects the upper contact of the switch 237 to the same input terminal of that differentiator. The lower contact of the switch is connected to the positive terminal of the source 226.

The differentiator 239 is connected to the right input terminal of the flip-flop 233 and it is further connected to the left input terminal of a flip-flop 241. The "or" network 232 is connected to the right input terminal of the flip-flop 241, and the left output terminal of this flip-flop is connected to the control grid of a triode 242. The cathode of the triode is grounded, and a resistor 243 connects its control grid to the negative terminal of the source 226.

The anode of the triode 242 is connected to one terminal of a solenoid coil 244. The other terminal of this coil is connected to the positive terminal of the source 226. The coil 244, in a manner similar to the control of the coil 236, controls the transfer mechanism 119 associated with the stack 118. Whenever the coil 244 is energized, the transfer mechanism 119 is conditioned to feed cards successively from the stack 118 to the periphery of the drum 114. However, when this coil is not energized, the transfer mechanism 119 functions to supply cards from the periphery of the drum 114 to the stack 118.

The output stack 118 includes a switch 246 mounted adjacent its mouth. The switch 246 may be similar to the switch 237, and its movable arm breaks with its upper contact and engages its lower contact when the last card leaves the stack 118. Alternately, the arm of the switch 246 breaks with its lower contact and engages its upper contact when the first card enters the stack 118.

The lower fixed contact of the switch 246 is connected to the positive terminal of the source 226. A resistor 247 connects the upper contact of the switch to the input terminal of a differentiator 248. A capacitor 249 connects the movable arm of the switch 246 to the input terminal of the differentiator 248.

The output terminal of the differentiator 248 is connected to the left input terminal of a flip-flop 250 and to the left input terminal of a flip-flop 251. The "or" network 232 is connected to the right input terminal of the flip-flop 250.

The left output terminal of the flip-flop 250 is connected to the control grid of a triode 252. A resistor 253 connects the control grid to the negative terminal of the source 226, and the cathode of the triode 252 is grounded. A solenoid energizing coil 254 is connected between the anode of the triode 252 and the positive terminal of the source 226. This energizing coil, in a manner similar to the coils 236 and 244, controls the transfer mechanism 124 of the stack 122. When the coil 254 is energized, the transfer mechanism 124 causes cards to be fed from the stack 122 to the periphery of the drum 116. Alternately, when the coil 254 is not energized, cards on the periphery of the drum 116 are transferred by the mechanism 124 into the stack 122.

The stack 122 has a switch 255 mounted adjacent its mouth. The switch 255 is similar to the switches 237 and 246. The movable arm of the switch 255 is connected to a capacitor 256, which, in turn, is connected to the input terminal of a differentiator 257. A resistor 258 connects the upper fixed contact of the switch 255 to the input terminal of the differentiator 257. The lower fixed contact of the switch 255 is connected to the positive terminal of the source 226.

The output terminal of the differentiator 257 is connected to a delay line 259, which, in turn, is connected to the right input terminal of the flip-flop 251.

The left output terminal of the flip-flop 251 is connected to the control grid of a triode 260. The cathode of the triode 260 is connected to ground. The control grid of this triode is connected to one terminal of a resistor 261, the other terminal of which is connected to the negative terminal of the source 226. A solenoid coil 262 connects the anode of the triode 260 to a positive terminal of the source 226. The coil 262 controls a solenoid valve in the air lead to the gate 126. Whenever this coil is energized, the valve is opened and the gate 126 emits a stream of air to cause cards on the drum 114 to be transferred to the drum 116.

The differentiator 230 is also connected to the left input terminal of a flip-flop 263. The left output terminal of the flip-flop 263 is connected to an input terminal of the "and" network 220 and is also connected to an input terminal of an "and" network 264. The output terminal of the "and" network 264 is connected to the left input terminal of a flip-flop 265. The right output terminal of the flip-flop 263 is connected to an input terminal of an "and" network 266 whose output terminal is connected to the right input terminal of the flip-flop 265.

The left output terminal of the flip-flop 265 is connected to an input terminal of the "and" network 220a and to an input terminal of an "and" network 267. The right output terminal of the flip-flop 265 is connected to an input terminal of an "and" network 268. The "and" network 267 is connected to the left input terminal of a flip-flop 269, and the "and" network 268 is connected to the right input terminal of the flip-flop 269. The left output terminal of the flip-flop 269 is connected to an input terminal of the "and" network 220b. The right output terminal of the flip-flop 269 is connected to an input terminal of an "and" network 270. The output terminal of the "and" network 270 is connected to the "or" network 232.

The differentiator 257 is connected to a delay line 271 whose output terminal is connected to an input terminal of the "and" network 270. The differentiator 257 is also connected to an input terminal of the "and" network 266, of the "and" network 268, of the "and" network 267, and of the "and" network 264. This differentiator is further connected to the right input terminal of the flip-flop 263.

The flip-flops referred to in the specification are bistable units which are well known to the computer and to the electronic art in general. These flip-flops may be constructed in a manner similar to that described on pages 164–166, inclusive, of volume 19, entitled "Wave Forms" of the Radiation Laboratories series published in 1949 by the Massachusetts Institute of Technology. Each of the flip-flops in the electrical system is provided with two input terminals designated for convenience as the left and right input terminals, and each is provided with two output terminals designated for convenience as the left and right output terminals. The input terminals are shown at the bottom of the block representing the flip-flop, and the output terminals are shown at the top of the block. A negative input signal introduced to any one of the input terminals produces a relatively high positive voltage at the corresponding output terminal. The flip-flops are said to be in their "true" states when their left output terminal exhibits a relatively high voltage, and they are said to be in their "false" state when their right output terminal exhibits a relatively high voltage.

The "and" networks referred to above, and those to be described subsequently, may be constructed in a manner to that described in and shown on page 32 of "Arithmetic Operations in Digital Computers" by R. K. Richards (published by D. Van Nostrand Company, Inc., of Princeton, N.J. in 1955). Each of the "and" networks is provided with a plurality of input terminals, and the networks are so constructed that a signal is translated by the particular network only when positive pulses are simultaneously impressed on all the input terminals of that network.

The differentiators 230, 239, 248, and 257 may be constructed in a manner similar to that described on pages 2–27 and 2–38, inclusive, of "Principles of Radar," second edition, published by the Massachusetts Institute of Technology.

The "or" networks referred to above and those to be described subsequently may be constructed in a manner described and shown on page 32 of "Arithmetic Operations in Digital Computers" by R. K. Richards (published by D. Van Nostrand Company, Inc. of Princeton, N.J. in 1955). Such networks are conditioned to pass a signal upon the introduction of a positive signal to one or more of its input terminals. These networks also are well known to the computer art.

To enable the apparatus of FIGURE 9 to perform its sorting function, the cards to be sorted are first placed in the stack 110. The selector 214 of FIGURE 11 is then manually adjusted so that the first series of operational cycles will be performed with respect to data recorded at a particular position on the card.

Then, to initiate the operation, the movable contact of the switch 228 is moved into engagement with the lower stationary contact of the switch. This causes the capacitor 229 to receive a positive charge from the positive terminal of the source 226. A transient current pulse, therefore, passes through the differentiator 230, which operates to sharpen the pulse. The pulse then passes through the "or" network 232 to the left input terminal of the flip-flop 233 and to the right input terminals of the flip-flops 241 and 250. The flip-flop 233 is, therefore, triggered to its "true" state, and the flip-flops 241 and 250 are triggered to their "false" states. When the switch 228 is released, the resistor 231 discharges the capacitor 229.

The flip-flop 233 now causes the triode 234 to be conductive so that the solenoid coil 236 is energized. This causes the transfer mechanism 111 to be conditioned for obtaining the feeding of cards successively from the input stack 110 to the periphery of the drum 114.

The triggering of the flip-flops 241 and 250 to the "false" states by the pulse from the differentiator 230 causes both the triodes 242 and 252 to be nonconductive and both the coils 244 and 254 to be de-energized. The transfer mechanisms 119 and 124 respectively associated with the stacks 118 and 122 are, therefore, placed in a condition to cause any cards reaching these mechanisms to be stripped from the drums 114 or 116 and deposited in the corresponding stacks.

As each card is transported past the magnetizing means 117 to the transducer means 115, the head 115e of FIGURE 11 first scans the displaced magnetized dots at the lower row of each card to produce a series of positive pulses. These pulses are amplified and inverted in phase by the amplifier 209 so that corresponding negative pulses are introduced to the right input terminal of each of the flip-flops 210, 211 and 212 to trigger all these flip-flops in the "false" operational states for each position of the card 14 in which the field dots are processed.

As the heads 115b, 115c and 115d scan field dots in the associated vertical columns on each card, positive pulses are produced whenever a magnetized dot is encountered. These positive pulses are amplified in the amplifiers 202, 204 and 206 to produce corresponding negative pulses which are introduced respectively to the left input terminals of the flip-flops 210, 211 and 212. The flip-flops 210, 211 and 212, therefore, are all triggered to their "false" states prior to each position of the card 14 and they then assume an operational state for each position of the card corresponding to the pattern of dots in the vertical column corresponding to that position. More specifically, for each magnetized dot encountered at each position of the card, the corresponding one of the flip-flops 210, 211 and 212 is triggered to its "true" state. Otherwise, the flip-flops remain in their "false" state.

The compare network 215 conditions the "and" networks 216, 216a, 217, 217a, 218 and 218a for the passage of signals only for the particular selected position on the card 14. Therefore, the flip-flops 219, 219a and 219b are triggered to assume respective operational states by the pulse from the compare network 215 corresponding to the operational states of the flip-flops 210, 211 and 212 at that particular position of the card. Each of the flip-flops 219, 219a and 219b in its "false" state represents the absence of a magnetized dot in its corresponding field row at that particular preselected position of the card 14. Alternately, each of these flip-flops in its "true" state represents the presence of a magnetized dot in its particular row at the preselected position of the card.

When the flip-flop 219 is in its "true" state, it represents the presence of a magnetized dot in the row of least ordinal significance at the particular position of the card. It will be remembered that, in the first operational cycle, this row is sensed and cards exhibiting the presence of a magnetized dot are directed to the stack 122, whereas those exhibiting the absence of such a dot in this row are passed to the stack 118. In the first cycle, therefore, only the "and" network 220 is conditioned to pass signals, so that the flip-flop 219 is effectively coupled through the "or" network 220c and through the delay line 221 to the left input terminal of the flip-flop 222. Then, if the least significant field row of a card exhibits a magnetized dot at the selected position in the first cycle of operation, flip-flop 222 is actuated to render the tube 224 conductive. This causes the coil 227 to be energized for activating the gate 128. The activation of the gate 128 causes the particular card to be transferred to the drum 116 for transport by the drum to the output stack 122. However, the absence of such a dot in the least significant row of any card at the particular position causes the flip-flop 219 to be triggered to the "true" state such that the flip-flop 222 is not actuated. Therefore, the gate 128 is not activated for that card and the particular card travels to the stack 118 and is deposited in that stack.

As previously described, the pulse from the compare network 215 occurs when the selected position of the particular card is reached. Upon the occurrence of the selected position in the particular card, the presence of a magnetized dot in the least significant row causes the flip-flop 222 to become actuated and the gate 128 to become activated. The gate 128 becomes activated at a time corresponding to the arrival of the particular card under the influence of the gate. This results from the operation of the lines 215a and 221 in delaying the introduction of any pulses to the flip-flop 222. The delay line 223 then passes the pulse after a particular period of time to trigger the flip-flop 222 to the "false" state for a de-activation of the gate 128. The gate 128 becomes de-activated after the transfer of the card from the drum 114 to the drum 116 has been obtained. In this manner, all of the cards in the stack 110 are processed, with the cards having a magnetized dot in their least significant field row at the particular position being deposited in the stack 122 and with the cards not having such a dot being carried and deposited in the stack 118.

When the last card leaves the stack 110, the movable arm of the switch 237 automatically becomes moved into engagement with the lower contact. This may be obtained by spring loading the movable arm of the switch for engagement with the lower stationary arm and by having the cards in the stack 110 oppose the loading of the spring. The engagement between the movable arm and the lower stationary contact of the switch 228 causes a transient surge of current to flow through the capacitor 238 and thereby causes the differentiator 239 to develop a current pulse having steep leading and trailing edges. This latter pulse triggers the flip-flop 233 into the "false" state to render the tube 242 nonconductive and condition the transfer mechanism 111 of the input stack 110 to strip cards from the periphery of the drum 114 and deposit such cards in the stack 110.

The pulse from the differentiator 239 is also introduced to the left input terminal of the flip-flop 241 to trigger that flop-flop to the "true" state. This causes the triode 242 to become conductive and energize the coil 244. When the coil 244 is energized, the transfer mechanism 119 associated with the stack 118 transforms the stack into an input stack and causes the cards in that stack immediately to be fed in sequence to the periphery of the drum 114.

The cards from the stack 118 are now carried by the drum 114 back to the input stack 111 and are deposited in the input stack. As the last card leaves the stack 118, the movable arm of the switch 246 closes on the lower contact of the switch in a manner similar to the engagement between the movable arm and the lower stationary contact of the switch 237. This produces a transient current surge through the capacitor 249, and the differentiator 248 produces a sharpened pulse to trigger the flip-flop 250 and 251 to the "true" states of operation.

When the flip-flop 250 is triggered to its "true" state, the triode 252 becomes conductive to energize the coil 254. This causes the transfer mechanism 124 associated with the stack 122 to transform that stack into an input stack. The cards in the stack 122 are now fed to the periphery of the drum 116 in a one-by-one sequence. The cards are then transported by the drum 116.

The triggering of the flip-flop 251 to its "true" state causes the triode 260 to become conductive to energize the coil 262. This activates the gate 126 so that the cards transported on the periphery of the drum 116 are returned to the drum 114 to be returned by that latter drum to the input stack 110. Because the stack 118 is conditioned as an input stack and because there are no cards in that stack, the cards returned from the drum 116 to the drum 114 are free to pass under the stack 118 on their travel back to the stack 110.

As the last card leaves the stack 122, the movable arm of the switch 255 closes on the lower fixed contact of the switch in a manner similar to that described above for the switches 237 and 246. In the manner described above, the differentiator 257 is caused to produce a sharpened current pulse. The pulse from the differentiator 257 triggers the flip-flop 251 to the "true" state after a delay produced by the delay line 259. This delay is long enough to permit the last card to be returned to the drum 114 before the triode 260 is rendered nonconductive to de-activate the gate 126.

The pulse from the differentiator 257 is also passed through the delay line 271, the "and" network 270, and the "or" network 232 to the left input terminal of the flip-flop 233 and to the right input terminal of the flip-flop 241 and to the right input terminal of the flip-flop 250. The "and" network 270 is conditioned to pass this pulse because the flip-flop 269 is in its "false" state.

It will be remembered that the original closure of the switch 228 triggered the flip-flop 263 to the "true" state to condition the "and" network 220 for the passage of signals. Now, the pulse from the differentiator 257 is introduced to the right input terminal of the flip-flop 263 to trigger that flip-flop to its "false" state and to render the "and" network 220 inactive. The pulse from the differentiator 257 also passes through the "and" network 264 to the left input terminal of the flip-flop 265 to trigger that flip-flop to its "true" state. The pulse also passes throug the "and" network 268 to the right input terminal of the flip-flop 269 to maintain the flip-flop 269 in its "false" state.

Because the flip-flop 269 is in its "false" state, the "and" network 270 is conditioned for translation so that the pulse from the differentiator 257 is able to reach the flip-flops 233, 241 and 250. This causes the input stack 110 again to be conditioned to feed the cards to the periphery of the drum 114, and it causes the stacks 118 and 122 to be conditioned to strip the cards from the peripheries of their associated drums.

The flip-flop 265 is now in its "true" state, and the flip-flops 263 and 269 are both "false." This means that only the "and" network 220a is conditioned for translation, and the "and" networks 220 and 220b are not so conditioned.

Now, as succeeding cards pass the transducer means 115, the flip-flops 219, 219a and 219b are actuated, in the described manner, at the particular selected position of each card, but only the conditional states of the flip-flop 219a are translated to the flip-flop 222. Therefore, the gate 128 is activated to transfer all cards whose second significant field row at the particular position exhibits a magnetized dot. Thus, and in a manner similar to that described above, all the cards with magnetized dots in this row at that position are stacked in the stack 122 and the other cards are stacked in the stack 118.

As before, and when the last card leaves the stack 110, the stack 118 is first conditioned to feed its cards back to the stack 110, and the stack 112 and gate 126 are then conditioned to feed the cards from the stack 122 back to the stack 110.

For the last operational cycle, the flip-flop 269 is triggered to its "true" state and the flip-flops 263 and 265 are triggered "false" in a manner similar to that described above. This means that only the "and" network 220b is conditioned to pass signals for the last cycle. Therefore, the cards are stacked in the stacks 118 and 122 in accordance with the presence or absence of a magnetic dot in the third significant field row at the selected position. At the termination of this last cycle, the cards in the stack 118 are first return to the input stack 110 and the cards in the stack 122 are then returned. Because the flip-flop 269 is "true" for this last cycle, the "and" network 270 is not conditioned to pass signals from the differentiator 257 to the flip-flops 233, 241 and 250. Therefore, at the end of this third cycle, the system draws to a halt.

It is, of course, evident that the number of cycles for each pass depends upon the number of field rows of significant data on the cards. Also, the cards are now stacked in the input stack 110 in order of the actual numeric or alphabetic code represented in one particular column. A second pass should now be instituted to sort the cards as to the significant data in the field column of second least significance. These passes are continued until the cards are completely sorted as to one group of information such as dates, monetary amounts, names, etc.

The second pass can be instituted on an automatic basis by automatically varying the setting of the selector 214. This can be accomplished by introducing signals from the differentiator 257 and the "and" network 267 to input terminals of an "and" network having its output terminal connected to control the operation of the selector 214. In this way, selector 214 becomes reset only after all of the cards have been processed as to the information in the field column of least significance and only after the cards have been returned in proper order to the input stack 110.

When the cards have been sorted in the manner described above, different groups or stacks of sorted cards may be collated into a single stack or into different stacks in a predetermined pattern. Such collating, for example, may be carried out in the manner described and claimed in copending application. Suitable apparatus will now be described in conjunction with FIGURES 12 to 16.

The apparatus shown in FIGURE 12 includes a central drum 272 which may be similar to the drum shown in FIGURE 10 and which is mounted for rotation about a vertical axis. A pair of input stacks 273 and 274 are mounted adjacent the peripheral surface of the drum 272 at spaced angular positions about the drum. Each of the stacks 273 and 274 supports a plurality of the cards 14 in a stacked condition such that the face of the first card in each stack rests against the peripheral surface of the drum 272. Therefore, one of the sorted stacks of cards from the system showing FIGURE 11 may be placed in the input stack 273, and another stack of sorted cards from that system may be placed in the input stack 274. These two stacks may then be collated in the manner to be described to render the cards suitable for further processing.

A card retainer 275 is associated with the input stack 273, and a retainer 275a is associated with the input stack 274. During the time that a vacuum force is produced in the retainer 275, it operates to counteract the vacuum force exerted by the drum 272 against the leading card in the stack 273 so as to prevent that card from being withdrawn by the drum from the stack. In like manner, the retainer 275a operates to prevent cards from being withdrawn by the drum 272 from the input stack 274.

Whenever the vacuum force in the retainer 275 or in the retainer 275a is interrupted, the leading card is drawn by the drum 272 out of the corresponding stack 273 or 274. The duration of the interruption of the vacuum force produced in the retainers 275 and 275a can be controlled to permit only one card at a time to be drawn onto the peripheral channel of the drum 272. The construction of retainers similar to the retainer 275 and 275a and suitable control apparatus for these retainers are disclosed in detail in copending application Serial No. 552,506, filed December 12, 1955, by Hans M. Stern.

A typical control arrangement for the unit 275 is shown in FIGURE 13. It will be appreciated that an identical arrangement can be used for the unit 275. As shown in FIGURE 13, an air line 276 extends to the retainer 275 and communicates with a conduit 276a in the retainer. The conduit 276a extends through the retainer 275 to a position contiguous to the leading card which is disposed in the stack 273 in coacting relationship with the drum 272. The line 276 extends at its opposite end to a solenoid control valve 277, or to a suitable control system such as that disclosed in the copending Stern application. The valve 277 is connected to a suitable vacuum pump (not shown) through an air line 279.

The valve 277 is controlled by a solenoid represented by the block 278. The constructional details of solenoid valves are extremely well known, and it is believed unnecessary to include a detailed description in this specification of such a valve. It is sufficient to state that a control source 280 is connected to the solenoid 278, and that the valve 277 is opened and closed under the control of the solenoid 278, which, in turn, is controlled by the control source 280.

The vacuum pump referred to above produces a constant vacuum force through the line 279, and, so long as the valve 277 is open, this vacuum force is transmitted through the line 276 to the conduit 276a and is directed against the leading card in the stack 273 to retain the card in that stack. However, when the control source 279 produces a flow of current through the solenoid 278, the valve 277 is closed and the vacuum force is removed from the line 276 and from the conduit 276a.

When the vacuum force is removed from the conduit 276a, the leading card in the stack 273 is withdrawn by the drum 272. As will be described in detail subsequently, the control source 280 provides a signal current of a sufficiently long time duration to obtain the withdrawal of one card only by the drum 272 from the input stack 273. At the end of such interval, the current flow through the solenoid 278 is interrupted so that the valve 277 is again opened, and the vacuum pressure is again established at the conduit 276a and against the now leading card in the stack 273 so as to retain the cards in the stack.

As noted above, the stacks 273 and 274 constitute the input stacks of the apparatus. These stacks are controlled in a manner to be described such that a card is selected from one or the other and transported on the periphery of the drum 272 as the drum rotates. The selected card is carried by the drum past a series of magnetizing heads such as the head 281 to magnetize the dots on the card if such dots were not previously magnetized. The selected card is then carried past a series of transducing heads such as the head 322.

As more clearly shown in FIGURE 16a, this transducing head may form one of a bank of transducing heads such as the heads 322, 324, 326 and 328. As in the system shown in FIGURE 11, these heads are arranged to scan all the bits of information in each column on the card to determine whether or not a magnetic dot is recorded. As many heads are used as there are rows of significant field magnetic dot information. In addition, the head 322 is used to scan a series of clock dots which correspond to the successive positions of each card and which constitute a source of clock or timing signals for the cards.

As each card is transported by the drum 272 past the transducing heads 322, 324, 326 and 328, the information at a selected position on the card is sensed by the heads and is made available for subsequent use. For example, if the cards are to be collated in accordance with customers' names, these heads first scan the first letter of each name so as first to collate the cards in accordance with this first letter in, for example, alphabetical order. Then, the cards are again processed through the system and this time the heads are controlled to process the second letter so that the cards are more closely collated, and so on, until a complete alphabetical order is obtained.

Output stacks 282 and 283 are positioned in contiguous relationship to the drum 272 at positions diametrically opposite to the input stacks 274 and 273, respectively. The output stacks 282 and 283, respectively, have throat members 285 and 285a which extend partially across the entrance to the stacks adjacent the periphery of the drum 272. Each of the throat members 285 and 285a extends from the wall defining the trailing edge of its associated stack toward the wall defining the leading edge of its associated stack. The thickness of the throat members 285 and 285a is preferably tapered at the forward end of these members to facilitate the transfer of cards from the drum 272 to the throat members.

The throat members 285 and 285a are so arranged that the cards in the peripheral channel of the drum 272 move with the drum past the output stacks 283 and 282 without becoming transferred to the stack during the time that no force is being exerted against the cards by the passage of air through lifters 286 and 286a respectively positioned adjacent the trailing edges of the stacks 282 and 283. However, when a flow of air is established in either of the lifters 286 or 286a, the leading edge of the transported card is drawn away from the periphery of the drum 272 and is positioned on a corresponding throat member 285 or 285a. This action will be described in detail subsequently.

When a card becomes positioned on the throat member 285 or on the throat member 285a, subsequent rotation of the drum 272 causes the card to be stripped off the periphery of the drum and deposited in the particular one of the output stacks 282 or 283 associated with the actuated lifter. The cards become deposited on the throat members 285 and 285a because the lifters 286 and 286a are positioned to be substantially tangential to and in contiguous relationship with the periphery of the drum 272 and adjacent the associated throat members.

The construction of the lifter 286 and its associated members is shown in further detail in FIGURES 14 and 15. The lifter 286a may have the same constructional details. As shown in these figures, the lifter 286 has a configuration corresponding substantially to a teardrop in a horizontal plane. In this configuration, the lifter is symmetrical about a line which is essentially tangential to the periphery of the drum 272 at a position slightly displaced from the throat member. The lifter 286 has a tapered configuration such that its narrow end is near the periphery of the drum at a position slightly retarded from the rear wall of the stack 282 in the direction of drum rotation.

The lifter 286 has a hollow interior shaped to define a mouth portion 287. The mouth portion 287 occupies almost the entire dimension of the lifter in a lateral direction, and it has a flared configuration in the vertical direction. The mouth portion 287 communicates with holes 288 provided at the end of the lifter closest to the periphery of the drum 272. The holes 288 are disposed at spaced vertical positions corresponding to the vertical level of the slots 289 in the drum 272 and which correspond to the slots 142 of FIGURE 10. The mouth portion 287 and the holes 288 are so disposed in the lifter 286 that the air passing through the holes is directed through the channel between the throat member 285 and the periphery of the drum 272.

A passageway 290 extends through the lifter 286 and communicates with the narrow end of the mouth portion 287. A feedline 291 is, in turn, coupled at one end to the passageway 290 and at the other end is adapted to receive air under pressure from an air source (not shown). A suitable valve 293 is disposed in the line 292 to control the flow of air through the line. The valve 293 may be a poppet valve which is normally closed and which is adapted to become opened when an associated solenoid 294 is energized. The solenoid 294 is, in turn, energized by a signal from a control source indicated in block form at 295.

When the solenoid 294 becomes energized by a signal from the control source 295, it opens the valve 293. This causes air under pressure to pass from the air source through the feedline 291 into the lifter 286. The air flows through the passageway 290 and through the mouthportion 287 of the lifter, and it emerges as streams from the holes 288 in the thin end of the lifter.

The streams of air have a relatively high velocity because of the small diameter of the holes 288. This causes the streams of air to impinge on the periphery of the drum 272 with a relatively great force. The force exerted by the streams of air remains substantially constant as the drum rotates since no such members as studs or spacers can interrupt the streams of air in any position of the drum.

The streams of air passing through the holes 288 are directed against the card on the periphery of the drum 272 after passing through the channel between the throat member 285 and the periphery of the drum. The streams of air, in effect, exert a shearing force between the periphery of the drum and the cards on the periphery, such that the cards are removed from the drum.

The cards are removed from the drum 272 at a position contiguous to the throat member 285 so as to be lifted onto the throat member. The cards then travel along the throat member into the stack 282 as the drum 272 continues to rotate.

Pawls 296 and 296a operate to insure that the cards withdrawn by the lifters 285 and 285a will become positioned in proper order in the stacks 282 and 283. Each of the pawls is displaced from the wall defining the trailing end of the associated output stack in a counterclockwise direction, this displacement being through a distance less than the length of the cards 14. In this way, each of the pawls is disposed at a position retarded with respect to the wall defining the leading edge of its associated output stack.

The pawls extend into the slots 289 of the drum 272 at their opposite ends and curve radially outwardly from the drum periphery in a humped configuration at an intermediate position. This configurations of the pawls enables them to lift the tail end of each card transferred to their output stacks so that the next card to be transferred becomes positioned between the pawl and the first card to deposit the first card in the stack. By such action, the cards are deposited one after the other in the output stacks 282 and 283 under the control of the lifters 286 and 286a.

The construction and operation of the lifters 286 and 286a and their associated members are fully disclosed in copending application Serial No. 562,154, filed January 30, 1956, by Stuart L. Peck and Loren R. Wilson.

FIGURES 16a and 16b show the electrical system for controlling the apparatus shown in FIGURE 12 and described above. The control system includes a plurality of magnetic transducer heads, such as the heads 322, 324, 326, 328, and 329 described above. It should be noted that, as in the control system of FIGURE 11, when ordinary opaque printing for the coded dots is used, the cards may be scanned by optical transducing means which respond to the presence or absence of an opaque spot to produce a sensible signal.

The heads 322, 324, 326, 328 and 329 correspond to the heads 115a, 115b, 115c, 115d and 115e of the control system shown in FIGURE 11, and they are so disposed as to scan all the rows of magnetized dots of the cards 14 as these cards are moved in succession by the drum past the heads.

The output signals from the heads 322, 324, 326, 328 and 329 are amplified by the amplifiers 380, 382, 384, 386 and 387. The output signals from the amplifiers 382, 384 and 386 are respectively introduced to the left input terminals of a plurality of flip-flops 390, 392 and 394. The output signal from the amplifier 380 is introduced to the left input terminal of a flip-flop 388, and this signal is introduced through a delay 396 to the right input terminal of this flip-flop. The output signal from the amplifier 387 is introduced to the right input terminals of the flip-flops 390, 392, and 394.

The transducer heads 324, 326 and 328 scan the field dots of the cards 14; the head 322 scans the row of clock dots; and the head 329 scans the lower row of dots corresponding to and preceding respective ones of the clock dots.

The right and left output terminals of the flip-flops 390, 392 and 394 are connected respectively to the input terminals of "and" networks 406 and 408, "and" networks 410 and 412, and "and" networks 414 and 416. The left output terminal of the flip-flop 388 is connected to a binary counter 422, and the output terminal of the binary counter is connected to a compare network 418. A selector 420 is also connected to the compare network 418, and the output terminal of the compare network is connected to an input terminal of each of the "and" networks 406, 408, 410, 412, 414 and 416.

A selector 420, like the selector 214 of the system of FIGURE 11, may be manually adjusted. This adjustment causes the compare network 418 to pass a signal only when the count of the binary counter 422 corresponds to the count indicated by the selector 420. The binary counter counts the clock pulses produced by the flip-flop 388, and it indicates the number of vertical columns or positions of each of the cards 14 which have moved past the transducer heads 322, 324, 326, 328 and 329. In this way, the compare network 418 passes a pulse only when a particular column on, or position of, a card 14 is being sensed by the heads. The construction and operation of the selector 420 and of the compare network 422 are described in detail in the previously referred to copending application Serial No. 566,404, filed February 20, 1956 by Jerome B. Wiener. Since the stages 418, 420 and 422 operate to compare two numbers, the comparators disclosed in Edwards Patent 2,615,127 and Woolard Patent 2,641,696 may also be used.

The output terminal of the binary counter 418 is also connected to the input terminals of "and" network 403 and of an "and" network 405. The second input terminal of the "and" network 403 is connected to the right output terminal of a flip-flop 417. In like manner, a second input terminal of the "and" network 405 is connected to the left output terminal of the flip-flop 417. Signals from the "and" network 405 pass through an "or" network 407 to the right input terminal of the flip-flop 417.

Another input terminal of the "or" network 407 is connected to the output terminal of a differentiator 307. This differentiator may be constructed in a manner similar to that described on pages 2–27 to 2–38, inclusive, of "Principles of Radar," Second edition, published by the Massachusetts Institute of Technology.

The input terminal of the differentiator 307 is connected to one terminal of a capacitor 309. The other terminal of the capacitor 309 has a common connection with the stationary contact of a switch 305. The movable contact of the switch 305 is attached to a sensor 303 pivotable at an intermediate position against the action of a spring 303b.

The sensor 303 has a finger 303a which is disposed against the periphery of the drum 272 of FIGURE 12 at a position diametrically opposite to the heads 322, 324, 326, 328 and 329, as best shown in FIGURE 12. Because of its disposition in contiguous relationship to the drum, the finger 303a becomes engaged by each card as it moves with the drum past the finger. When the finger is so engaged, the sensor 303 is pivoted in a counterclockwise direction to close the switch 305. The movable contact of the switch 305 is connected to one terminal of a suitable voltage source such as a battery 311. The other terminal of this source is connected to ground.

The output signals from the "and" networks 406, 408, 410, 412, 414 and 416 are respectively introduced to the input terminals of a plurality of "and" networks 446, 448, 450, 452, 454 and 456. Second input terminals of this latter group of "and" networks are connected to the right output terminal of a flip-flop 458. Connections are respectively made from the output terminals of the "and" networks 446 and 448 to the right and left input terminals of a flip-flop 460, the connection to the right input terminal of the flip-flop being made through an "or" network 447. Connections are similarly made from the output terminals of the "and" networks 450 and 452 to the right and left input terminals of a flip-flop 462, the connection to the right input terminal of the flip-flop being made through an "or" network 451. In like manner, the signals from the output terminals of the "and" networks 454 and 456 are applied to the right and left input terminals of a flip-flop 464, the signals being applied to the right input terminal of the flip-flop through an "or" network 455. Each of the "or" networks 447, 451 and 455 has a second input terminal connected to a lead 493. The lead 493 is also connected to an input terminal of an "or" network 407.

The left and right output terminals of the flip-flops 460, 462 and 464 are connected to a comparator 466 which is shown in block form for purposes of simplicity. The comparator 466 is formed from a plurality of "and" and "or" networks interrelated in accordance with a logical equation. The comparator may be constructed and operated in a manner similar to that disclosed in Edwards Patent 2,615,127 and Woolard Patent 2,641,696.

The output terminals of the "and" networks 406, 408, 410, 412, 414 and 416 are also respectively connected to input terminals of a plurality of "and" networks 470, 472, 474, 476, 478 and 480. Each of the latter group of "and" networks has a second input terminal which is connected to the left output terminal of the flip-flop 458. Connections are respectively made from the output terminals of the "and" networks 470 and 472 to the right and left input terminals of a flip-flop 484, from the output terminals of the "and" networks 474 and 456 to the right and left input terminals of a flip-flop 486, and from the output terminals of the "and" networks 478 and 480 to the right and left input terminals of a flip-flop 488. The left and right output terminals of the flip-flops 484, 486 and 488 are connected to the comparator 466.

The comparator 466 has three output terminals which are connected respectively to leads 490, 492 and 494 shown in FIGURES 16a and 16b. The signals in the leads 490 and 492 are adapted to pass through an "or" network 514 (FIGURE 16b) to the input terminals of a delay line 516. The delay line 516 is provided with characteristics for delaying a signal for a period of time corresponding substantially to the time required for a card to move from the heads 322, 324, 326, 328 and 329 to the output stack 283 in FIGURE 12. The output terminal of the delay line 516 is connected to a series of "and" networks 511, 513 and 515.

The output signals from the "and" network 511 are directly introduced to an input terminal of an "or" network 525. However, the output signals from the "and" networks 513 and 515 respectively pass through delay lines 517 and 519 to other input terminals of the "or" network 525. The delay line 517 is provided with characteristics for delaying signals for a period of time corresponding to the time required for a card to move with the drum 272 from the heads 322, 324, 326, 328 and 329 to the output stack 283 in FIGURE 12. The delay line 519 provides a delay corresponding substantially to the time required for a card to travel from these heads to the output stack 282 in FIGURE 12.

The output terminal of the "or" network 525 is connected to the left input terminal of a flip-flop 549 and to the input terminal of a delay line 551 having its output terminal connected to the right input terminal of the flip-flop 549. The left output terminal of the flip-flop 549 is connected to the control grid of a triode 553, this control grid being returned to a negative biasing source C-minus through a grid resistor 555. The cathode of the triode 553 is grounded, and its anode is connected to one terminal of the energizing winding of the solenoid 294a similar to the solenoid 294 shown in FIGURE 14 and which controls the transfer of the cards from the drum 272 to the output stack 283. The other terminal of the solenoid winding 294a is connected to the stationary contact of a manually-operated switch 614. The movable contact of this switch is connected to the positive terminal of a suitable voltage source such as a battery 610. The negative terminal of the battery 610 is grounded.

The output lead 494 from the comparator is connected to the input terminal of a delay line 520 which is adapted to provide a delay corresponding to the time required for a card to move with the drum 272 from the heads 322, 324, 326, 328 and 329 to the output stack 282. The output terminal of the delay line 520 is connected to respective input terminals of a series of "and" networks 505, 507 and 509. The output terminal of the "and" network 505 is connected directly to the input terminal of an "or" network 527. However, the signals from the "and" networks 507 and 509 respectively pass through delay lines 521 and 523 to input terminals of the "or" network 527. The delay lines 521 and 523 are provided with characteristics respectively corresponding to the characteristics of the delay lines 517 and 519.

The signals from the "or" network 527 pass to the left input terminal of a flip-flop 548 and through a delay line 550 to the right input terminal of that flip-flop. The left output terminal of the flip-flop 548 is connected to the control grid of a vacuum tube 552, this grid being biased from the negative source C-minus through a grid resistor 554. The cathode of the tube 552 is grounded, and the anode of the tube is connected to one terminal of the energizing winding of the solenoid 294 of FIGURE 12. The other terminal of the energizing winding of the solenoid 294 is connected to the stationary contact of the switch 614.

The output leads 492 and 494 from the comparator 466 are also respectively connected to the input terminals of an "or" network 524. The signals passing through the "or" network 524 are applied to the left input terminal of a flip-flop 526. The left output terminal of the flip-flop 526 has a common connection with one input terminal of an "and" network 503, another input terminal of which "and" network is connected to the left output terminal of a one-shot multivibrator 522. The output terminal of the "and" network 503 is connected through a lead 497 (FIGURES 16a and 16b) to the right input terminal of the flip-flop 458 in FIGURE 16a.

The signals from the "and" network 503 are also applied to the left input terminal of a flip-flop 534 and to the input terminal of a delay line 536 having its output terminal connected to the right input terminal of that flip-flop. The left output terminal of the flip-flop 534 is connected to the control grid of a vacuum tube 538, this grid being biased from the negative source C-minus through a resistor 540. The cathode of the tube 538 is grounded, and the anode of the tube is connected to one terminal of the solenoid 278 (see also FIGURE 13) which controls the transfer of cards from the input stack 273. The other terminal of the solenoid is connected to the stationary contact of the switch 614.

The output terminal of the "and" network 503 is also connected to the left input terminal of a flip-flop 535. The left output terminal of the flip-flop 535 is connected to input terminals of the "and" networks 507 and 513. The right output terminal of the flip-flop 535 is connected to input terminals of the "and" networks 509 and 515. The other input terminals of the "and" networks 507, 509, 513 and 515 receive voltages from the right output terminal of a flip-flop 518. Similarly, the other input terminals of the "and" networks 505 and 511 are connected to the left output terminal of the flip-flop 518.

The output lead 490 from the comparator 466 is also connected to the left input terminal of a flip-flop 528. The left output terminal of the flip-flop 528 is connected to an input terminal of an "and" network 501 having another input terminal connected to the left output terminal of the one-shot multivibrator 522. The left input terminal of the multivibrator 522 is connected through the lead 491 in FIGURES 16a and 16b to the output terminal of the differentiator 307 of FIGURE 16a.

The multivibrator 522 may be constructed in a manner similar to that disclosed on pages 2–44 to 2–58, inclusive, of "Principles of Radar" (Second edition), published by the Members of the Staff of the Massachusetts Institute of Technology.

The output terminal of the "and" network 501 is connected to one input terminal of an "or" network 597. Another input terminal of the "or" network 597 has a common connection with the output terminal of a differentiator 532, the input terminal of which receives signals passing through a capacitor 533 from the stationary contact of the switch 614. Signals from the differentiator pass through the "or" network 597 and through a lead 495 in FIGURES 16a and 16b to the left input terminal of the flip-flop 458 in FIGURE 16a.

In addition to passing through the "or" network 597, the output signals from the "and" network 501 are introduced to the right input terminal of the flip-flop 528 and to an input terminal of an "or" network 558. A second input terminal of the "or" network 558 is connected through the lead 493 to the output terminal of the differentiator 532. Connections are made from the output terminal of the "or" network 558 to the right input terminal of the flip-flop 535 and to the left input terminal of a flip-flop 560. The signals from the "or" network 558 also pass to the input terminal of a delay line 564 having its output terminal connected to the right input terminal of the flip-flop 560.

The left output terminal of the flip-flop 560 is connected to the control grid of a vacuum tube 566. The control grid of the tube 566 is negatively biased through a grid resistor 568 from the biasing source C-minus. The cathode of the tube 566 is grounded and the anode of the tube is connected to the solenoid 278a which controls the vacuum of the retainer 275a (FIGURE 12) at the mouth of the input stack 274. The other terminal of the solenoid 278a is connected to the stationary contact of the switch 614.

The right output terminal of the flip-flop 458 in FIGURE 16a is connected through the lead 489 in FIGURES 16a and 16b to the input terminals of "and" networks 504, 506 and 508 in FIGURE 16b. In like manner, the voltage on the left output terminal of the flip-flop 458 is introduced through the lead 487 in FIGURES 16a and 16b to input terminals of "and" networks 502, 510 and 512.

Signals respectively pass to second input terminals of the "and" networks 502 and 508, the "and" networks 504 and 510, and the "and" networks 506 and 513 through the leads 490, 492 and 494 (FIGURES 16a and 16b) from the comparator 466 in FIGURE 16a. The output signals from the "and" networks 502, 504 and 506 (FIGURE 16b) are introduced through an "or" network 593 to the left input terminal of the flip-flop 513. In like manner, the output signals from the "and" networks 508, 510 and 512 pass through an "or" network 595 to the right input terminal of the flip-flop 518.

The horizontal row of the card 14 in FIGURE 16a which is scanned by the head 322 has a prerecorded dot of magnetizable material for each position of the card. These dots, like the others on the card, are magnetized by the magnetizing means 281 of FIGURE 12 or the magnetizing means 117 of FIGURE 9. These dots are read by the head 322 to produce a series of clock pulses which are amplified by the amplifier 380. The amplified pulses are then introduced as negative pulses to the left input terminal of the flip-flop 388.

Each negative pulse from the amplifier 380 triggers the flip-flop 388 to produce a relatively high voltage on the left output terminal of that flip-flop. After a certain time and before the introduction of the next negative pulse, the first pulse from the amplifier 380 passes through the delay line 396 to the right input terminal of the flip-flop 388. The delayed pulse triggers the flip-flop 388 so as to return the flip-flop to the original state, as represented by a relatively high voltage on its right output terminal and a relatively low voltage on its left output terminal. The flip-flop 388, therefore, is triggered by each pulse from the amplifier 380 to produce a sequence of clock pulses representing the movement of successive vertical columns on the card 14 past the transducer heads 324, 326 and 328.

Each time that the voltage on the left output terminal of the flip-flop 388 changes from a high to a low level, the count in the binary counter 422 is increased by one integer. The binary counter is constructed in known manner to provide a different pattern of operation for each such count. It may be formed, for example, by a plurality of flip-flops connected in a cascade arrangement to provide an individual pattern of operations for the different numbers of clock pulses.

The binary counter 422 is shown in FIGURE 16a as being coupled to the selector 420 by an output lead. Actually, this output lead may represent a plurality of leads from the different flip-flops in the counter, and the output lead from the selector 420 to the compare network 418 may also represent a plurality of output leads.

The compare network 418 passes a signal only when the signals on the output leads from the flip-flops in the counter 422 correspond to the signals from the selector 420. The selector may be manually set to provide signals of any desired pattern. The arrangement is such that the compare network 418 passes a signal only when a particular selected vertical column on each card is read by the heads 324, 326 and 328.

The operation of the counter 422, the selector 420 and the compare network 418, and the structural details of these units, are described in detail in copending application Serial No. 566,404, filed February 20, 1956, for Jerome B. Wiener.

These units permit a manual adjustment to be made so that the various cards may be sorted in accordance with different groups of information recorded on them. For example, the collating may be made in accordance with dates. In that case, the selector 420 is set so that the system responds only to the reading of the position on the various cards corresponding to the date of the transaction. Different stacks of cards may then be collated. First they are grouped in accordance with the year, then in accordance with the month, and then in accordance with the day, a separate pass being made for each position of the card corresponding to the the particular one of the positions corresponding to the dots bearing significant information as to dates.

In like manner, and by the appropriate control of the selector 420, other portions of the cards may be processed so that different stacks of the cards may be collated with respect to other pertinent information.

The heads 324, 326 and 328 in FIGURE 16a produce pulses in accordance with the magnetized dots recorded on the different vertical columns in the field area of the cards 14. For example, the heads 324, 326 and 328 produce positive pulses representing a pattern of 1–0–1 for the first vertical column of the card illustrated in FIGURE 16a. In accordance with the particular code used in the illustrated embodiment, this, for example, would represent the digit "5." In like manner, the second column might represent the digit "2" and the third column might represent the digit "3."

As they scan the magnetized dots on the card 14, the positive pulses from the heads 324, 326 and 328 are amplified and inverted by the amplifiers 382, 384 and 386 and are introduced as negative triggering signals to the left input terminals of the flip-flops 390, 392 and 394, respectively. These signals trigger the flip-flops 390, 392 and 394 into the "true" states of operation as represented by relatively high voltages on the left output terminals of the flip-flops.

Like the head 115a shown in FIGURE 11, the transducer head 329 scans the displaced magnetized dots of the lower row of each of the cards. Therefore, for each position of the card being processed and prior to the processing of the card by the other heads, the head 329 introduces a positive pulse to the amplifier 387. The amplifier then introduces a negative pulse to the right input terminals of the flip-flops 390, 392 and 394 so that, prior to the processing of each position of the card, these flip-flops are all returned to their "false" states of operations. Then, as the heads 324, 326 and 328 scan the various magnetized field dots on the card 14, the flip-flops 390, 392 and 394 are triggered to their "true" state and in a pattern corresponding to the pattern of the dots for each scanned position of the card.

The means that the flip-flops 390, 392 and 394 are effectively triggered into "true" or "false" states of operation in a pattern dependent upon the information contained in successive vertical field columns on each card 14 as the cards move past the heads. As previously described, although three such heads are shown, more can be used so that the number of heads will correspond to the number of horizontal rows of information in the field area of each of the cards.

The voltages on the left and right output terminals of the flip-flops 390, 392 and 394 are introduced to the "and" networks 406, 408, 410, 412, 414 and 416. Because these "and" networks have second input terminals connected to the output terminal of the compare network 418, they are conditioned to pass signals only when the compare network produces an output pulse. As described previously, such a pulse is produced by the compare network only when a particular desired vertical column of the card 14 is being sensed by the transducer heads.

Therefore, "and" networks 406, 408, 410, 412, 414 and 416 are conditioned to pass the voltages from the flip-flops 390, 392 and 394 only when a selected position of each card is being processed, as determined by the selector 420.

The output signals from the "and" networks 406, 408, 410, 412, 414 and 416 are introduced to the bank of "and" networks 446, 448, 450, 452, 454 and 456, and to the second bank of "and" networks 470, 472, 474, 476, 478 and 480. The operation of these first and second banks of "and" networks is controlled by the flip-flop 458 so that only one bank is conditioned to pass signals at any time. For example, the first bank passes a signal when the flip-flop 458 is in its "false" state to produce a relatively high voltage at its right output terminal. On the other hand, the second bank is conditioned to pass signals when the flip-flop 458 is in its "true" state.

The signals passing through the "and" networks of the first bank are introduced to the left and right input terminals of the flip-flops 460, 462 and 464. The signals trigger these flip-flops into an operational pattern corresponding to the pattern of the flip-flops 390, 392 and 394.

In like manner, the signals passing through the "and" networks of the second bank are introduced to the left and right input terminals of the flip-flops 484, 486 and 488. These latter signals, therefore, trigger the flip-flops 484, 486 and 488 into a pattern of operational states corresponding to the pattern of the flip-flops 390, 392 and 394.

Therefore, by the appropriate control of the flip-flop 458, the information in a particular vertical column on each card may be stored in one bank composed of the flip-flops 460, 462 and 464 or in a second bank composed of the flip-flops 484, 486 and 488.

The voltages from the flip-flops 460, 462 and 464 and from the flip-flops 484, 486 and 488 are introduced to the comparator 466. The comparator 466 compares the voltages from these two banks of flip-flops and determines whether the number stored in one bank is less than, equal to or greater than the number stored in the other. Similarly, the comparator may operate to determine if an alphabetical letter stored in one bank precedes, corresponds to, or follows an alphabetical letter stored in the other. This latter operation of the comparator occurs when it is desired to collate the various cards in alphabetical order.

During the processing of numerical information on the cards 14, the comparator 466 produces a pulse on its output lead 494 when the signal information produced in the flip-flops 484, 486 and 488 has a numerical value greater than the value of the signal information stored in the flip-flops 460, 462 and 464. In like manner, the comparator produces a pulse on its output lead 490 when the information stored in the flip-flops 484, 486 and 488 has a numerical value less than the value of the signal information stored in the flip-flops 460, 462 and 464. Also, the comparator 466 produces a pulse on the output lead 492 when the numerical information represented by the signals stored in the flip-flops 460, 462 and 464 is the same as the information stored in the flip-flops 484, 486 and 488.

To initiate the operation of the system shown in FIGURES 16a and 16b, the switch 614 of FIGURE 16b is manually closed. This produces a transient surge of current through the capacitor 533 to charge the capacitor. This current passes to the differentiator 532, which steepens the leading edge of the transient surge to produce a positive triggering pulse on the lead 493.

The pulse on the lead 493 passes through the "or" network 597 and the lead 495 to the left input terminal of the flip-flop 458 to trigger that flip-flop to the "true" state. This causes the "and" networks 470, 472, 474, 476, 478 and 480 to become prepared for the passage of a signal and it prevents the "and" networks 446, 448, 450, 452, 454 and 456 from becoming operative.

The triggering pulse on the lead 493 also passes through the "or" network 407 in FIGURE 16a to trigger the flip-flop 417 to the "false" state. Upon a triggering of the flip-flop 417 to the "false" state of operation, the "and" networks 406, 408, 410, 412, 414 and 416 become conditioned to pass signals.

The triggering pulse on the lead 493 also passes through the "or" network 558 in FIGURE 16b to the right input terminal of the flip-flop 535 and to the left input terminal of the flip-flop 560. The signal triggers the flip-flop 535 to the "false" state and triggers the flip-flop 560 to the "true" state.

The high voltage produced on the left output terminal of the flip-flop 560 when it is triggered to its "true" state is introduced to the grid of the tube 566 to render that tube conductive. When the tube 566 becomes conductive, current flows through the energizing coil of the solenoid 278a. This causes the vacuum force exerted by the retainer 275a of the input stack 274 to become interrupted so that the drum 272 can withdraw a card from that stack. When the withdrawn card becomes positioned on the periphery of the drum, it is held in fixed position on the periphery of the drum by the vacuum force exerted on it by the drum.

The triggering pulse from the "or" network 558 also passes through the delay line 564 to the right input terminal of the flip-flop 560. This pulse triggers the flip-flop 560 to return the flip-flop to the "false" state of operation after a particular interval of time. The time delay provided by the line 564 corresponds to the time required to remove one card from the stack 274. When the flip-flop 560 is returned to its "false" state, the tube 566 is again rendered nonconductive. This causes the vacuum force to be re-established by the retainer 275a against the cards 14 in the input stack 274. This vacuum force prevents the next card in the input stack 274 from being withdrawn by the drum 272 from the stack.

Upon the removal of the card from the input stack 274 by the drum 272, the card travels with the drum past the magnetizing means 281 so that its dots may be magnetized. The card then travels past the heads 322, 324, 326, 328 and 329. The head 329 reads the magnetized dots in the lower row of the card to return all the flip-flops 390, 392 and 394 to their "false" operational states for each position of the cards as described above. Then, when the particular position of the card corresponding to the position selected by the selector 420 is reached, the compare network 418 impresses a positive pulse on the "and" networks 406, 408, 410, 412 and 416. Since the bank of "and" networks 470, 472, 474, 476 and 478 have been prepared to pass signals by the flip-flop 458, the signals from the "and" networks 406, 408, 410, 412 and 416 are passed through this bank to the flip-flops 484, 486 and 488. These flip-flops are, therefore, triggered into a pattern of operational states corresponding to the magnetized field dots on the card at the selected position.

Because the "and" networks 446, 448, 450, 452, 454 and 456 are not conditioned for operation, the flip-flops 460, 462 and 464 are not affected by the signals from the "and" networks 406, 408, 410, 412, 414 and 416. It should be pointed out that the triggering signal produced by closing the switch 614 to initiate the operation of the system passes on the lead 493 through the "or" networks 447, 451 and 455 to the right input terminals of the flip-flops 460, 462 and 464 initially to set all these flip-flops in their "false" operational states. These flip-flops, therefore, represent zero.

Assuming that a number greater than zero is represented by the selected vertical column on the card 14, the comparator 466 will produce a pulse on its output lead 494. This follows because the representation provided by the flip-flops 484, 486 and 488 is greater than that provided by the flip-flops 460, 462 and 464.

The pulse on the lead 494 passes to the "and" networks 506 and 512. However, only the "and" network 512 is conditioned for the passage of a signal because of the "true" state of the flip-flop 458. Because of this, the pulse on the lead 494 passes through the "and" network 512 and through the "or" network 595 to the right input terminal of the flip-flop 518. This pulse triggers the flip-flop 518 to its "false" state to condition the "and" networks 507, 509, 513 and 515 for the passage of signals but to close the "and" networks 505 and 511 against the passage of signals.

The pulse on the lead 494 also passes to the delay line 520 which delays the pulse for a period of time required for the card to move from the heads 322, 324, 326, 328 and 330 past the output stack 283 to the output stack 282. The pulse is then introduced to the "and" networks 505, 507 and 509. The pulse from the delay line 520 is unable to pass through the "and" network 505 because of the introduction of a relatively low voltage to the "and" network from the left output terminal of the flip-flop 518. The pulse from the delay line 520 is also unable to pass through the "and" network 507 because the flip-flop 535 is in its "false" state. However, the pulse from the delay line 520 is able to pass through the "and" network 509 to the delay line 523 because of the state of the flip-flop 535.

Because of the delay previously provided by the delay line 520, the pulse passes through the "and" network 509 to the delay line 523 at the same time the card reaches the output stack 282. The delay line 523 then operates to delay the pulse for a period of time corresponding to the movement of the card between the heads 322, 324, 325 and 328 and the output stack 283. In this way, the pulse is able to pass the "or" network 527 to the left input terminal of the flip-flop 548 only after the card has moved past the output stack 282. Because of this, the card cannot be transferred to the output stack 282 even though the lifter 286 in FIGURE 12 becomes activated upon the passage of a signal through the "or" network 527 and the actuation of the flip-flop 548 to render the tube 552 conductive.

The pulse on the lead 494 is also introduced through the "or" network 524 to the left input terminal of the flip-flop 526. The pulse triggers the flip-flop 526 to the "true" state to condition the "and" network 503 for conduction. The card now circulates to the sensor 303 to close the switch 305. This establishes a continuous circuit to the capacitor 309 of FIGURE 16a and causes the surge of current to flow through the capacitor from the battery 311. This current is differentiated in the differentiator 307 to produce a sharp pulse on the lead 491. This pulse is introduced to the left input terminal of the one-shot multivibrator 522 to trigger the multivibrator to a "true" state as represented by the relatively high voltage on its left output terminal. This relatively high voltage continues only for a particular time interval in accordance with the properties of this type of multivibrator.

The voltage from the multivibrator 522 passes through the conditioned "and" network 503 to the left input terminal of the flip-flop 534. It also passes to the right input terminal of the flip-flop 526 to return the latter flip-flop to its "false" state of operation and to return the "and" network 503 to a nonconductive condition.

The flip-flop 534 is, therefore, triggered to its "true" operational state. This renders the tube 538 conductive so that the input stack 273 can release a card to the drum 272. The delay line 536 assures that the flip-flop 534 will remain conductive only long enough for one card to be released.

There are now two cards circulating on the drum 272. The card just withdrawn from the stack 273 is positioned on the drum a short distance ahead of the card previously withdrawn from the input stack 274.

The output pulse from the "and" network 503 is also introduced over the line 497 to the right input terminal of the flip-flop 458 to trigger that flip-flop to its "false" state. This triggering of the flip-flop 458 conditions the "and" networks 446, 448, 450, 452, 454 and 456 to be conductive and causes the bank of "and" networks 470, 472, 474, 476, 478 and 480 to be nonconductive.

The completion of the scanning of the original card by the head 322, causes the binary counter 422 to introduce a pulse corresponding to the full count through the "and" network 403 to the left input terminal of the flip-flop 417 to trigger that flip-flop to its "true" state. This prevents the "and" networks 406, 408, 410, 412, 414 or 416 from passing any signal. However, the actuation of the sensor 303 by the original card from the input stack 274 also causes the flip-flop 417 in FIGURE 16a to be returned to its "false" state, the pulse from the differentiator passing to the right input terminal of this flip-flop through the "or" network 407. This triggering of the flip-flop 417 to its "false" state again conditions the "and" networks 406, 408, 410, 412, 414 and 416 for translation. Therefore, the card from the input stack 273 is scanned by the heads 322, 324, 326, 328 and 330 in the previously described manner and the information at its selected position passes through the "and" networks 406, 408, 410, 412, 414 and 416.

Due to the fact that the flip-flop 458 is now in its "false" state, the information at the selected position of the second card passes to the flip-flops 460, 462 and 464, instead of the flip-flops 484, 486 and 488. The latter group of flip-flops remain conditioned in a pattern corresponding to the selected position of the first card.

Upon the completion of the processing of this latter card by the head 322, the binary counter 422 introduces the pulse corresponding to the full count to the "and" networks 403 and 405. Because the flip-flop 417 is in its "false" state, only the "and" network 403 is conditioned to translate this pulse. The pulse, therefore, is introduced to the left input terminal of the flip-flop 417 to trigger it to its "true" state. This again blocks the "and" networks 406, 408, 410, 412, 414 and 416. Therefore, when the first card passes under the heads 380, 382, 384, 386 and 387 for the second time, it has no effect on the system, because the "and" networks 406, 408, 410, 412, 414 and 416 block all the signals derived from that card.

The pattern of signals produced in the flip-flops 460, 462 and 464 is compared in the comparator 466 with the pattern previously produced by the first card in the flip-flops 484, 486 and 488. Assuming that the numerical indication produced by the flip-flops 460, 462 and 464 is still less than the numerical indications in the flip-flops 484, 486 and 488, the output pulse produced by the comparator 466 again appears on the output lead 494.

Because the flip-flop 458 is now in its "false" state, the "and" networks 504, 506 and 508 in FIGURE 16b now become conditioned for the passage of signals. The pulse on the lead 494 passes through the "and" network 506 and through the "or" network 593 to the left input terminal of the flip-flop 518. This latter flip-flop is, therefore, triggered to its "true" state to prepare the "and" networks 505 and 511 for translation but to close the "and" networks 507, 509, 513 and 515.

The pulse on the lead 294 also passes through the delay line 520 to the "and" networks 505, 507 and 509. Because of the characteristics of the delay line 520, the pulse passes through the delay line to the "and" network 505 at the time the card from the input stack 273 reaches the output stack 282. Because the "and" network 505 is conditioned to pass this pulse, the pulse is passed through the "or" network 527 to the left input terminal of the flip-flop 548. The flip-flop 548 is triggered by the pulse to its "true" state so as to render the tube 552 conductive. The delay line 550 causes the flip-flop 548 to remain in its "true" state long enough for the tube 552 to cause the lifter 286 (FIGURE 12) to feed the card into the output stack 282.

In this manner, therefore, the card selected from the input stack 273, and which represented a numerical quantity less than the original card from the input stack 274 at its selected position, is deposited in the output stack 282.

The pulse on the line 494 also passes through the "or" network 524 to the left input terminal of the flip-flop 526. The pulse then triggers the flip-flop 526 to its "true" state to prepare the "and" network 503 for translation. When the original card again reaches the sensor 303, it again closes the switch 105 to cause a triggering pulse to be introduced to the multivibrator 522. The multivibrator again produces a pulse which passes through the "and" network 503 to the left input terminal of the flip-flop 534.

In the manner described, another card is released from the input stack 273 to the drum 272. The cycle of operations is repeated, and cards from the input stack 273 continue to be transported by the drum 272 and are deposited in the output stack 282.

It will be remembered that the cards in the input stack 273 have been previously sorted so that the numerical quantities represented at the selected position of successive cards from that stack is continually increasing. The cycle of operations described above continues until the numerical quantity of a card selected from the stack 273 equals that of the original card selected from the stack 274. In response to such a card, and in the described manner, a pulse is produced on the lead 492 from the comparator 466.

The pulse on the lead 492 passes through the "and" network 504 which has been conditioned to pass that pulse by the flip-flop 458 in its "false" operational state. The pulse then passes from the "or" network 593 to the left input terminal of the flip-flop 518. This pulse has no effect on that flip-flop because it is already in its "true" state. Therefore, the "and" networks 505 and 511 are still conditioned for the passage of signals and the "and" networks 507, 509, 513 and 515 remain closed against the passage of signals.

The pulse on the lead 492 is also introduced through the "or" network 514 and through the delay line 516 to the "and" networks 511, 513 and 515. Of these, however, only the "and" network 511 is conditioned by the flip-flop 518 for the passage of signals. Because of this, the pulse passes through the "and" network 511 and through the "or" network 525 to trigger the flip-flop 549. The delay in the line 516 is such that the flip-flop 549 is triggered to render the output 553 conductive as the last card from the input stack 273 reaches the output stack 283. This causes the transfer mechanism of the output stack 283 to transfer the card from the drum 272 to that stack. The delay line 551 assures that the transfer mechanism is so activated long enough only to transfer that particular card. The delay line then returns the flip-flop 549 to its original "false" state to render the tube 553 once more nonconductive.

The pulse introduced from the comparator 466 to the lead 492 also passes through the "or" network 524 in FIGURE 16b to the flip-flop 526 to trigger that flip-flop to its "true" state. This causes the flip-flop to prepare the "and" network 503 to pass signals introduced to its other input terminal. The next time the original card actuates the sensor 103, the resulting pulse from the multivibrator 522 passes through the "and" network 503 to trigger the flip-flop 534 to its "true" state. This causes, in the described manner, yet another card to be selected from the input stack 273 and transferred to the drum 272.

The pulse from the "and" network 503 is also introduced to the left input terminal of the flip-flop 535. This pulse has no effect on the flip-flop 535 since it is already in its "true" state. Therefore, the "and" networks 305 and 311 remain conditioned for the passage of signals. The flip-flop 458 also remains in its "false" state since the signal from the "and" network 530 is introduced through the lead 497 to the right input terminal of that flip-flop.

Assume now that the numerical information at the selected position of this last card from the input stack 273 is greater than that of the original card from the input stack 274, then the comparator 466 produces an output pulse on the lead 490. The pulse on the lead 490 is introduced to the "and" networks 502 and 508 in FIGURE 16b. Of these "and" networks, only the network 308 is conditioned for the passage of signals because the flip-flop 258 is in its "true" state. This causes the pulse on the lead 490 to pass through the "and" network 508 and through the "or" network 595 to the right input terminal of the flip-flop 518. This pulse triggers the flip-flop 518 to its "false" state to condition the "and" networks 507, 509, 513 and 515 for the passage of signals and to close the "and" networks 505 and 511.

The pulse on the lead 490 is also introduced through the "or" network 514 and through the delay line 516 to the "and" networks 511, 513 and 515. Of these "and" networks, only the networks 513 and 515 are conditioned by the flip-flop 518 for the passage of signals. Of the "and" networks 513 and 515, only the network 513 is conditioned by the flip-flop 535 in its "true" state to pass signals. Therefore, the pulse on the lead 490 passes through the "and" network 513, and through the delay line 517 and the "or" network 525 to the left input terminal of the flip-flop 549. The pulse triggers the flip-flop 549 to its "true" state, and the transfer mechanism associated with the output stack 283 is actuated at a time dependent on the delay of the line 516 plus the additional delay of the line 517. These two time delays cause the transfer mechanism to be actuated at the proper time to remove the original card from the input stack 274 and deposit it in the output stack 283. The last card removed from the input stack 273, however, continues to circulate on the drum 272 to the sensor 303.

The pulse passing through the line 490 from the comparator 466 is also introduced on the left input terminal of the flip-flop 528 to trigger that flip-flop to its "true" state. This conditions the "and" network 501 for translation so that when the last card from the input stack 273 passes the sensor 303 to actuate the multivibrator 522, the transfer mechanism for the input stack 274 is actuated rather than for the stack 273. This causes a second card from the input stack 274 to be circulated on the drum 272 a short distance ahead of the card from the input stack 273.

Now, and in a manner similar to that described, cards are continually selected from the input stack 274 and deposited in the output stack 282 until their numerical quantities at the selected vertical column equals or exceeds to that represented by the card from the input stack 273 that is now circulating on the drum 272.

If a card from the input stack 274 is reached whose numerical information at the particular position corresponds to that of the circulating card from the stack 273, this particular card from the stack 274 is deposited in the output stack 283. Another card is then selected from the input stack 274, and, if its numerical quantity is greater than that of the circulating card from the input stack 273, the latter card is deposited in the output stack 283 and the last card from the stack 274 is circulated on the drum. The cycle of operations is again repeated with cards being fed from the input stack 273 until their numerical quantities equal or exceed that of the card from the stack 274.

In the manner described above, and as described in greater detail in copending application Serial No. 596,222, all the cards from the input stack 274 are deposited in the output stack 283. In addition, and in the proper sequence, any card in the input stack 273 bearing numerical information corresponding to a card in the stack 274 is also deposited in the output stack 283. All other cards from the input stack 273 are deposited in the output stack 282.

It is evident, therefore, that the system of FIGURE 12 may be utilized, for example, to select cards from the stack 273 concerning subscribers whose cards are stacked in alphabetical order in stack 274, and to collate the selected cards from the stack 273 so that they are stacked in the stack 283 in the proper order with the cards from the stack 274.

It should be appreciated that the collating operation described is only by way of example and that other types of collating operations may be performed on the cards 14 by designing the control system so that it will operate in accordance with a desired pattern. For example, the collating system can be designed to stack the cards from a pair of input stacks in alphabetical order in a common output stack, the cards in the separate input stacks previously having been sorted into alphabetical order in each of those stacks by the system and apparatus of FIGURES 9 and 12. In like manner, stacks of the cards that have been previously sorted can be collated into a common output stack in order of date, numerical amounts, or in any other desired sequence for accounting or other data processing purposes.

After the cards of the present invention have been sorted by the mechanism and system of FIGURES 9 and 11, and after they have been collated by the mechanism and system of FIGURES 12, 16a and 16b, they may be stored in a magazine such as the magazine 700 in FIGURE 17. The system and mechanism shown in FIGURE 17 is disclosed and claimed in copending application Serial No. 587,055, filed May 24, 1956 by Alfred M. Nelson et al. It is believed unnecessary, therefore, to describe the structural details of the equipment of FIGURE 17 in detail in the present description. The purpose of showing this mechanism and of showing the sorting and collating mechanisms and systems described previously is to illustrate different means and mechanisms whereby the cards of the present invention may be conveniently processed.

In brief, therefore, the magazine 700 includes a series of individual compartments 702. The cards may be stored in these compartments in the order in which they were sorted and collated by the previous mechanisms. The magazine is controllable so that any desired one of the compartments may be brought to an operating position to enable one or more cards from a selected indexed compartment to be obtained and processed.

The arrangement includes a table top 704 on which a vacuum drum 706 is rotatably mounted. The drum 706 may be similar in its construction to the drum described in conjunction with FIGURE 10. The drum 706 serves as a transport means for the cards, with the cards being securely held on its peripheral surface by the vacuum pressure described previously.

When an appropriate compartment of the magazine 700 is aligned with the table top 704, this compartment may be moved forward to the illustrated position to constitute an input stack for the drum 706. The cards in this compartment are held in stacked condition on the table top 704, with the leading cards being positioned against the peripheral surface of the drum. A transfer mechanism 708 which may be similar to that described in conjunction with FIGURE 13 controls the transfer of the cards from the positioned one of the compartments 702 to the periphery of the drum 706.

The cards from the positioned compartment may be fed in sequence to the periphery of the drum, and they are transported in succession by the drum past a transducer means 710. This transducer means is mounted on the table top 704 and is positioned adjacent the drum 706.

A suitable gate means, which may be similar to the gates 126 and 128, is indicated as 712. This gate means is positioned on the table top 704 between the drum 706 and a second vacuum pressure drum 714 which is rotatably mounted on the table top 704 adjacent the drum 706. A gate means 712 is controlled in a manner similar to the control described for the gates 126 and 128 of FIGURE 9 to control the transfer of cards from the drum 706 to the drum 714 and back from the drum 714 to the drum 706.

A transducer means 716 is mounted on the table top 704 adjacent the periphery of the drum 714. This latter transducer means serves to process the cards transferred from the drum 706 to the drum 714.

A first stack 718 is mounted on the table top 704 with its mouth adjacent the peripheral surface of the drum 714. The stack 718 may, for example, have a transfer mechanism 720 positioned at its mouth for controlling the transfer of cards from the drum 714 to the output stack.

A second stack 722 may be mounted on the table top 704 with its mouth adjacent the peripheral surface of the drum 706. A transfer mechanism 724 may be associated with the stack 722 to control the transfer of cards from the drum 706 to the stack, and vice versa.

The transfer mechanisms 720 and 724 may be similar to the mechanism disclosed and claimed in U.S. Patent No. 2,842,362, issued to Robert M. Hayes and Alfred M. Nelson. That is, these transfer mechanisms may be reversible and controllable either to feed cards from the drums to their associated stacks, or from their associated stacks, to the respective drums.

Now, whenever a card or group of cards is to be selected for further processing, a magazine 700 is controlled to bring the compartment bearing that group into an operative position with the drum 706. The compartment is then moved forward to constitute an input stack for the drum. The transfer mechanism 708 is now controlled so that cards are fed from the positioned compartment to the periphery of the drum 706. These cards are transported by the drum past the transducer means 710. Appropriate control systems cause the gate means 712 to be activated only when the desired card or cards are reached and only the cards to be processed are transferred to the drum 714. The desired cards are then transported by the drum 714 past the transducer means 716. This latter transducer means is capable of feeding pertinent information from the desired cards to appropriate utilizing means in a manner well known to the art.

The cards that are not selected for processing are transported by the drum 706 to the stack 722. The cards selected for processing may either be deposited in the output stack 718 after processing, or they may be returned to the drum 706 to be returned by the latter drum to the positioned compartment of the magazine 700. The cards in the output stack 722 may, likewise, be returned to the positioned compartment of the magazine 700 at the termination of the processing operation.

It is evident from the foregoing description, that the information cards 14 bearing transaction data recorded on them in the described manner are well suited for data processing. The described apparatus is capable of sorting and collating the cards rapidly and automatically so that they may be stored in the magazine 700 of FIGURE 17 in any desired order for subsequent processing and utilization of their recorded data by means of the apparatus of FIGURE 17.

Apparatus is shown in FIGURE 18 for automatically feeding cards from the chopper 66 to an input stack 800 corresponding to the input stacks 273 and 274 in FIGURE 12. The apparatus includes a rotatable conveyor wheel 802 disposed near the chopper 66. The top of the wheel 802 is approximately at the same horizontal level as a slot 804 in the chopper 66 such that the cards pass through the slot 804 and onto the wheel 802 for movement with the wheel in a clockwise direction in FIGURE 18. A chute 806 is disposed at one end in abutting relationship to the conveyor wheel 802 to receive the cards moving with the wheel and to guide the cards in a direction away from the wheel. The chute 806 has a guide surface 808 which becomes inclined at a progressively increasing angle as the cards move along this surface from the conveyor wheel 802.

The movement of the cards along the guide surface 808 of the chute 806 is controlled by apparatus including a cam 810 and a cam follower 812. The cam 810 has a dwell portion 814 of raised configuration and a working surface 814 of a lower configuration than the dwell portion. The cam follower 812 is adapted to be rotated by suitable motor (not shown) in synchronism with the rotary movements of the conveyor wheel 802. The cam follower 812 is provided with a spider configuration formed by a plurality of arms 818. Each of the arms 818 is independently pivotable in a vertical direction in the cam follower 812 in accordance with the disposition of feelers 820 which extend downwardly from the arms and contact the dwell portion 814 and the working surface 816 of the cam 810. Each of the arms 818 has a finger 822 which extends downwardly from the outer end of the arm and which has a cylindrical configuration 824 at its bottom end.

As the cam follower 812 rotates, the spider arms 818 pivot upwardly or downwardly in accordance with the disposition of the feelers 820 on the cam. During the disposition of the feelers 820 on the working surface 816 of the cam 810, the cylindrical portions 824 at the external end of the spider arms engage the cards in the chute 802 and move the cards in a direction away from the conveyor wheel 802.

The cards are moved by the spider arms 818 to a position at the external end of the chute 806, where the cards are subjected to streams of air under pressure through conduits 819. The streams of air may be synchronized with the movements of the cam follower 812 so that the streams of air are applied only after the arms 818 have released the cards upon the movement of the cards through the chute. The arms 818 release the cards as the arms move upwardly from the working surface 816 to the dwell portion 814 of the cam 810.

By applying an upward stream of air against the bottom surface of the cards, the cards become lifted from the guide surface 808 of the chute 806 and become deposited in the input stack 800. At the same time that the cards become deposited in the stack 800, they become moved toward a drum 826 by the action of a drive rod 828. The drive rod 828 is attached to a drive wheel 830 for movement in a direction toward or away from the drum 826 in accordance with the rotary movements of the wheel.

The movements of the drive wheel 830 can be synchronized with the movements of the cam follower 812 so that the drive rod 828 moves toward the drum 826 only after a card has been moved through the chute 806 and has become deposited in the input stack 800. In this way the cards become positioned in the input stack 800 to obtain a subsequent withdrawal of the cards from the input stack by the drum 826. The drum 826 may correspond in construction and operation to the drum 114 in FIGURE 10.

It should be appreciated that the apparatus shown in FIGURE 18 is intended only to be illustrative and that other apparatus can also be used. For example, the cards can be transported from the chopper 66 by a belt rather than along the guide surface 808 of the chute 806.

The invention provides, therefore, an improved system by means of which transaction data may be accumulated in a convenient form and upon a convenient medium for accounting or other processing purposes. As described in the specification, the transaction data is recorded at the transaction point upon a card which itself is suitable for data processing. The cards may subsequently be sorted automatically in the manner described, and they may then be collated so they can be formed into a convenient stack for data processing purposes.

It should be appreciated that the term "transport means" as used in the claims is intended to include any type of apparatus including rotatable drums for obtaining a movement of the cards. It should also be appreciated that the term "cards" as used in the claims is intended to include any form of discrete elements capable of receiving bits of information.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with means for providing a continuous tape, means operative upon the tape for recording signal information on the tape to represent particular data, means responsive to the recording of information on the tape for cutting the tape into information cards after the recording of particular signal information on the tape, an input stack for holding the information cards, means operative upon the production of the cards for introducing the information cards to the input stack, transport means for the cards, means coupled to the cards in the input stack for obtaining a controlled and individual transfer of cards from the input stack to the transport means, and means including transducing means operatively coupled to the cards being transferred from the input stack to the transport means to obtain a sensing, decoding and a processing of the cards in accordance with the signal information recorded on the cards.

2. In combination for use with means for providing a continuous tape, first transducer means coupled to the tape for recording signal indications on the tape in accordance with information introduced to the transducer means, means including a cutter coupled to the transducer means for severing the tape into cards upon the recording of particular signal indications on the tape, an input stack, means operative upon the severing of the tape into information cards for introducing the information cards to the input stack, means including a rotatable drum disposed in contiguous relationship to the input stack for obtaining a transfer of cards from the input stack to the drum for movement with the drum, and means including second transducing means operation upon the cards transferred to the drum for sensing, decoding and processing the cards transferred from the input stack to the drum in accordance with selective signal information recorded on the cards by the transducer means.

3. In combination for use with means for providing a continuous tape, first transducer means disposed in coupled relationship to the tape for recording signal indications on the tape to represent information in coded form, means responsive to the recording of signal indications on the tape by the first transducer means for advancing the tape, means responsive to the recording of signal indications on the tape by the first transducer means for cutting the tape into information cards upon the recording of particular information on the tape, an input stack, means operative upon the formation of the information cards for advancing the information cards into the input stack in an order corresponding to the production of the cards by the cutting means, transport means for the cards, means coupled to the cards in the input stack for obtaining a controlled and individual transfer of cards from the input stack to the transport means, second transducer means disposed in coupled relationship to the transport means for producing signal indications in accordance with selective signal indications recorded on the cards by the first transducer means and upon a transport of the cards, means controlled by the signal indications from the second transducer means for obtaining the processing of the cards in accordance with the information represented by such signal indications, and means including at least one output stack disposed in coupled relationship to the transported cards for obtaining a transfer of the information cards to the output stack in accordance with the processing of the information cards.

4. In combination for use with means for providing a continuous tape, first transducer means coupled to the tape for recording signal indications on the tape to represent particular information, means coupled to the first transducer means for advancing the tape in accordance with the recording of signal information on the tape, means coupled to the first transducer means for cutting the tape into information cards upon recording of the particular information on the tape, an input stack, means operative upon the cutting of the tape into information cards for advancing the information cards into the input stack upon the formation of the cards, a rotatable drum constructed to hold the cards in fixed position on the drum periphery for movement with the drum, means disposed in coupled relationship to the cards in the input stack for obtaining a controlled and individual transfer of cards from the input stack to the drum, means including at least first and second output stacks disposed relative to the drum to provide a transfer to the output stacks of the cards transferred to the drum from the input stack, second transducer means disposed relative to the cards on the drum for producing signals in accordance with the signal indications recorded on the information cards, and means responsive to the signal indications produced by the second transducer means and coupled to the output stacks for obtaining the controlled transfer to the first and second output stacks of the cards transferred to the drum from the input stack and for obtaining such a controlled transfer in accordance with the signal indications produced by the second transducer means.

5. In combination for use with means for providing a continuous tape, first transducer means coupled to the tape for recording signal indications to represent particular information, means coupled to the tape and responsive to the recording of the signal indications by the first transducer means for advancing the tape in accordance with the recording of signal information on the tape, means coupled to the tape and responsive to the recording of the signal indications by the first transducer means for cutting the tape into information cards upon the recording of particular information on the tape, an input stack for holding the information cards for subsequent withdrawal, means coupled to the cards for advancing the cards into the input stack for storage in the stack, transport means for the cards, means disposed relative to the cards in the input stack for obtaining a controlled transfer of cards from the input stack to the transport means, second transducer means disposed relative to the information cards during the transport of the cards to produce signals in accordance with the signal information recorded on the cards, means disposed relative to the cards on the transport means and responsive to the signals produced by the second transducer means for controlling the transport path of the cards and for providing such controls in accordance with the signal indications produced by the second transducer means, and means including at least one output stack disposed relative to the cards on the transport means for providing a transfer of the transported cards to the output stack in accordance with the path of movement of the cards.

6. In combination for use with means for providing a continuous tape, first transducer means coupled to the tape for recording signal indications representing particular information in coded form, means coupled to the tape and responsive to the information recorded on the tape by the first transducer means for advancing the tape in accordance with the recording of the signal indications on the tape, means coupled to the tape and responsive to the information recorded on the tape by the first transducer means for cutting the tape into information cards upon the recording of particular information on the tape, an input stack for holding the information cards, means coupled to the cards for advancing the information cards into the input stack, means including a rotatable drum constructed to receive a vacuum force on its periphery for holding the information cards in fixed position on the periphery of the drum, means disposed relative to the cards in the input stack to obtain a controlled and individual transfer of cards to the periphery of the drum from the input stack second transducer means disposed relative to the information cards moving with the drum to produce signals in accordance with the signal indications previously recorded by the first transducer means, means coupled to the second transducer means for operating upon the signal indications from the second transducer means to produce control signals, means responsive to the control signals for obtaining a controlled movement of the cards with the drum in accordance with the production of the particular control signals, and means including at least a pair of output stacks operative upon the cards moving with the drum for providing a transfer of the cards to the different stacks in accordance with differences in the paths of movement followed by the cards.

7. In combination for use with means for providing a continuous tape, first transducer means disposed in coupled relationship to the tape for recording signal indications on the tape to represent particular information, drive means controlled by the signal indications from the first transducer means for advancing the tape upon the recording of the signal indications on the tape, means controlled by the signal indications from the first transducer means for cutting the tape into information cards upon the recording of particular signal indications on the tape, a first input stack for holding a plurality of information cards, a second input stack for holding a plurality of information cards, means disposed relative to the cards for advancing information cards into the first input stack upon the formation of the cards from the tape, transport means constructed to provide a movement of the cards with the transport means upon the withdrawal of the cards from the input stacks, control means disposed relative to the cards in the input stacks for obtaining a controlled transfer of information cards from the input stacks, at least one output stack for holding a plurality of cards, second means responsive to the signals from the processing means for obtaining a controlled transfer to the output stack of one of the cards being transported at any instant in accordance with the comparison of the signal indications on the cards transferred to the transport means, and means responsive to the signals from the processing means for providing an operation of the control means to obtain a transfer of the next card in a particular one of the input stacks to the transport means in accordance with such processed information.

8. The combination set forth in claim 5 in which means including at least a second output stack is disposed in coupled relationship to the transport means to provide a transfer of particular ones of the transported cards to the second output stack in accordance with the path of transport of the cards produced by the operation of the controlling means.

9. In combination for use with means for providing a continuous tape, means including first transducing means operative upon the tape for recording signal information on the tape, means coupled to the first transducing means for obtaining an advance of the tape upon each recording of information on the tape, means responsive to the recording of information upon the tape for cutting the tape into cards upon the recording of particular information upon the tape, an input stack, means operative upon the cards for advancing the cards into the input stack in the order of formation of the cards, transport means for the cards, means disposed relative to the cards in the input stack for obtaining a controlled transfer of the cards from the input stack to the transport means, means including second transducing means operative upon the transported cards for sensing and decoding selective information on such cards, means including first and second output stacks disposed relative to the cards on the transport means for obtaining a transfer of the transported cards to the output stacks in accordance with the path of transport of the cards, means operatively coupled to the second transducing means and responsive to the selective information decoded on the transported cards for processing such information, and means coupled to the processing means for controlling the path of transport of each card in accordance with the processed information.

10. In combination for use with means for providing a continuous tape, means including first transducing means coupled to the tape for recording signal information on the tape, means responsive to the recording of signal information by the first transducing means for obtaining an advance of the tape upon each such recording, means responsive to the recording of signal information on the tape by the first transducer means for cutting the tape into cards upon the recording of particular signal information on the tape, an input stack for holding the cards in stacked relationship, means operative upon the cards for obtaining an advance of the cards into the input stack upon the formation of the cards, a pair of transport means for the cards, the transport means in the pair being disposed relative to each other to facilitate a transfer of cards from a first one of the transport means in the pair to the second transport means in the pair, means operative upon the cards in the input stack for obtaining a controlled and individual transfer of cards in sequence from the input stack to the first transport means in the pair, gating means disposed between the transport means in the pair and operative in one relationship to obtain a transfer of cards from the first transport means in the pair to the second transport means in the pair and operative in a second relationship to prevent such a transfer of cards from the first transport means in the pair to the second transport means in the pair, means including a first output stack disposed relative to the first transport means in the pair at a position past the position of transfer of cards from that transport means to the second transport means in the pair for obtaining a transfer of cards from the first transport means to the first output stack, means including a second output stack disposed relative to the second transport means in the pair to provide a transfer to the second output stack of the cards transferred to the second transport means in the pair from the first transport means in the pair, means including second transducing means operative upon the cards transferred to the first transport means in the pair from the input stack for sensing and decoding selective information on such cards, means including electrical circuitry operatively coupled to the second transducing means and responsive to the selective information decoded from each transported card for processing such decoded information, and means including electrical circuitry responsive to the processed information for providing a controlled operation of the gating means in the first and second relationships in accordance with such processed information to obtain a controlled transfer of the cards into the first and second output stacks.

11. In combination for use with means for providing a continuous tape, means including first transducer means coupled to the tape for recording signal information on the tape, means responsive to the recording of signal information on the tape for obtaining an advance of the tape, means responsive to the recording of signal information on the tape for cutting the tape into cards upon the recording of particular information on the tape, an input stack for the cards, means operative upon the formation of the cards for advancing the cards into the input stack, a pair of movable transport means disposed relative to each other to facilitate a transfer of cards from a first one of the transport means in the pair to the second transport means in the pair, gating means disposed between the transport means in the pair and operative in a first relationship to obtain a transfer of cards from the first transport means in the pair to the second transport means in the pair and operative in a second relationship to prevent such a transfer of cards from the first transport means in the pair to the second transport means in the pair, the transport means being constructed to obtain a movement of the cards with the transport means, means operative upon the cards in the input stack for obtaining a controlled transfer of the cards in sequence from the input stack to the first transport means in the pair, means including electrical circuitry responsive to selective information on the cards being transferred to the first transport means from the input stack for sensing and decoding such selective information on the cards, means including electrical circuitry operatively coupled to the sensing and decoding means and responsive to the selective information decoded from the cards for processing such decoded information, means including electrical circuitry operatively coupled to the processing means and responsive to the processed information for operating upon the gating means in accordance with such processed information to control the path of movement of the cards with the transport means, and means including first and second receiving means respectively disposed relative to the first and second transport means in the pair for respectively obtaining a transfer to the first and second receiving means of the cards moving with the first and second transport means and for obtaining such transfer in accordance with the particular paths of movement of the cards resulting from the operation of the gating means.

12. The combination set forth in claim 11 in which the transport means in the pair are movable in closed loops and are constructed to hold the cards in fixed position on the transport means during such movement and in which means are operatively coupled to the transport means in the pair for obtaining a movement of the transport means in the closed loops.

References Cited in the file of this patent

UNITED STATES PATENTS

| | | |
|---|---|---|
| 1,701,436 | Baker | Feb. 5, 1929 |
| 1,811,397 | Langford | June 23, 1931 |
| 1,955,819 | Maul | Apr. 24, 1934 |
| 2,110,862 | Hart et al. | Mar. 15, 1938 |
| 2,172,754 | Lasker | Sept. 12, 1939 |
| 2,189,027 | Fuller | Feb. 2, 1940 |
| 2,206,206 | Smith | July 2, 1940 |
| 2,285,296 | Maul | June 2, 1942 |
| 2,306,211 | Geiss | Dec. 22, 1942 |
| 2,379,828 | Rubidge et al. | July 3, 1945 |
| 2,392,082 | Curtis | Jan. 1, 1946 |
| 2,686,052 | Winkler | Aug. 10, 1954 |
| 2,704,634 | Rauch | Mar. 22, 1955 |
| 2,751,433 | Linger | June 19, 1956 |
| 2,752,154 | Nelson | June 26, 1956 |
| 2,784,392 | Chaimowicz | Mar. 5, 1957 |
| 2,795,328 | Tyler | June 11, 1957 |
| 2,883,189 | Wilson | Apr. 21, 1959 |